US007319208B2

(12) United States Patent
Gotoh et al.

(10) Patent No.: US 7,319,208 B2
(45) Date of Patent: Jan. 15, 2008

(54) CONTROLLER AND GLOW PLUG FOR CONTROLLING ENERGIZATION MODES

(75) Inventors: Shunsuke Gotoh, Nagoya (JP); Chiaki Kumada, Gifu (JP); Hiroyuki Kimata, Aichi (JP); Seigo Muramatsu, Aichi (JP); Takayuki Sakurai, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 18 days.

(21) Appl. No.: 10/513,990

(22) PCT Filed: May 13, 2003

(86) PCT No.: PCT/JP03/05923

§ 371 (c)(1), (2), (4) Date: Nov. 12, 2004

(87) PCT Pub. No.: WO03/095828

PCT Pub. Date: Nov. 20, 2003

(65) Prior Publication Data

US 2006/0049163 A1 Mar. 9, 2006

(30) Foreign Application Priority Data

May 14, 2002 (JP) ............................. 2002-139341
Nov. 29, 2002 (JP) ............................. 2002-346962

(51) Int. Cl.
*F23Q 7/22* (2006.01)
*G05D 23/24* (2006.01)
*H05B 1/02* (2006.01)

(52) U.S. Cl. ...................... 219/270; 219/497; 219/492; 219/544; 219/260; 123/145 A; 123/145 R; 361/264; 361/265; 361/266

(58) Field of Classification Search ................ 219/270, 219/497, 492, 544; 123/145 A, 145 R; 361/264–266
See application file for complete search history.

(56) References Cited

U.S. PATENT DOCUMENTS 4,144,380 A 3/1979 Beltran et al.

(Continued)

FOREIGN PATENT DOCUMENTS

DE 3713532 A1 11/1988

(Continued)

OTHER PUBLICATIONS

International Search Report for PCT/JP03/05923 dated Sep. 2, 2003.

*Primary Examiner*—Tu Ba Hoang
*Assistant Examiner*—Stephen J. Ralis
(74) *Attorney, Agent, or Firm*—Sughrue Mion, PLLC

(57) ABSTRACT

There is provided a control device for a glow plug, capable of controlling the energization of a resistance heater of the glow plug by a resistance control process while attaining good resistance control response under cooling of the heater by fuel injection and combustion gas and thereby stably controlling the amount of heat generated by the heater. The resistance heater includes a resistive heating element having a ratio of electrical resistance R1000 at 1000° C. to electrical resistance R20 at 20° C. of 6 or larger, and the glow plug is mounted with at least part of the resistive heating element being protrudingly located in an engine combustion chamber. Under such a condition, the control device controls energization of the resistance heater in a steady control mode to adjust electrical power supplied to the resistance heater in such a manner as to keep a resistance of the heater within a predetermined range.

23 Claims, 17 Drawing Sheets

U.S. PATENT DOCUMENTS

| | | | | | |
|---|---|---|---|---|---|
| 4,334,147 | A | * | 6/1982 | Payne | 219/497 |
| 4,423,309 | A | * | 12/1983 | Murphy et al. | 219/270 |
| 4,512,297 | A | * | 4/1985 | Ichikawa et al. | 123/179.21 |
| 4,556,781 | A | | 12/1985 | Bauer | |
| 4,577,601 | A | * | 3/1986 | Klak | 123/298 |
| 5,091,631 | A | * | 2/1992 | Dupuis et al. | 219/270 |
| 5,093,555 | A | * | 3/1992 | Dupuis et al. | 219/270 |
| 5,130,517 | A | * | 7/1992 | Schmid et al. | 219/270 |
| 5,132,516 | A | * | 7/1992 | Hatanaka et al. | 219/270 |
| 5,144,922 | A | * | 9/1992 | Kong | 123/145 A |
| 5,172,664 | A | * | 12/1992 | Mueller et al. | 123/145 A |
| 5,319,180 | A | | 6/1994 | Locher et al. | |
| 5,823,155 | A | * | 10/1998 | Burner | 123/145 A |
| 6,064,039 | A | * | 5/2000 | Kumada | 219/270 |
| 6,148,258 | A | * | 11/2000 | Boisvert et al. | 701/99 |
| 6,420,683 | B1 | * | 7/2002 | Chiba et al. | 219/270 |
| 6,712,032 | B2 | * | 3/2004 | Uhl et al. | 123/145 A |
| 2001/0050275 | A1 | * | 12/2001 | Uhl | 219/270 |

FOREIGN PATENT DOCUMENTS

| | | | | |
|---|---|---|---|---|
| DE | 10014526 | A1 | | 9/2001 |
| EP | 0950858 | A2 | | 10/1999 |
| JP | 54-60630 | A | | 5/1979 |
| JP | 57-115622 | A | | 7/1982 |
| JP | 58-135371 | A | | 8/1983 |
| JP | 58-135372 | A | | 8/1983 |
| JP | 59-60125 | A | | 4/1984 |
| JP | 59-121793 | A | | 7/1984 |
| JP | 60-26223 | A | | 2/1985 |
| JP | 61-46470 | A | | 3/1986 |
| JP | 61-268875 | A | | 11/1986 |
| JP | 61-61013 | B2 | | 12/1986 |
| JP | 62-17520 | A | | 1/1987 |
| JP | 62-87670 | A | | 4/1987 |
| JP | 2-245479 | A | | 10/1990 |
| JP | 04-057629 | U | | 5/1992 |
| JP | 6-18032 | A | | 1/1994 |
| JP | 7-119967 | A | | 5/1995 |
| JP | 08-5073 | A | | 1/1996 |
| JP | 09126456 | A | * | 5/1997 |
| JP | 2000-130752 | A | | 5/2000 |
| JP | 2000-249034 | A | | 9/2000 |
| JP | 2004191040 | | * | 7/2004 |

* cited by examiner

FIG.10

| $\Delta R$ | $\Delta R_1$ | $\Delta R_2$ | $\Delta R_3$ | ····· |
|---|---|---|---|---|
| $\eta$ | $\eta_1$ | $\eta_2$ | $\eta_3$ | ····· |

FIG.11

| $\Delta R$ \ $Vx$ | $Vx_1$ | $Vx_2$ | $Vx_3$ | $Vx_4$ | ····· |
|---|---|---|---|---|---|
| $\Delta R_1$ | $\eta_{11}$ | $\eta_{12}$ | $\eta_{13}$ | $\eta_{14}$ | ····· |
| $\Delta R_2$ | $\eta_{21}$ | $\eta_{22}$ | $\eta_{23}$ | $\eta_{24}$ | ····· |
| $\Delta R_3$ | $\eta_{31}$ | $\eta_{32}$ | $\eta_{33}$ | $\eta_{34}$ | ····· |
| ⋮ | ⋮ | ⋮ | ⋮ | ⋮ | |

FIG.12

| | | | | | |
|---|---|---|---|---|---|
| $\Delta R$ | $\Delta R_1$ | $\Delta R_2$ | $\Delta R_3$ | $\Delta R_4$ | ····· |
| $\kappa$ | $\kappa_1$ | $\kappa_2$ | $\kappa_3$ | $\kappa_4$ | ····· |

FIG.13

| | | | | | |
|---|---|---|---|---|---|
| Vx | $Vx_1$ | $Vx_2$ | $Vx_3$ | $Vx_4$ | ····· |
| $\eta'$ | $\eta'_1$ | $\eta'_2$ | $\eta'_3$ | $\eta'_4$ | ····· |

FIG.14

| | | | | | |
|---|---|---|---|---|---|
| Vx | $Vx_1$ | $Vx_2$ | $Vx_3$ | $Vx_4$ | ····· |
| Tp | $Tp_1$ | $Tp_2$ | $Tp_3$ | $Tp_4$ | ····· |

CONTROLLER AND GLOW PLUG FOR CONTROLLING ENERGIZATION MODES

TECHNICAL FIELD

The present invention relates to a glow plug control device and a glow plug used for the preheating of a diesel engine and the like.

BACKGROUND ART

A glow plug for the preheating of a diesel engine and the like is generally equipped with a resistance heater (hereinafter occasionally just referred to as a "heater"). This glow plug is assembled by fixing the resistance heater in a metallic shell, and mounted onto the engine block of a diesel engine by means of a thread cut in an outer cylindrical surface of the metallic shell in such a manner that a front heating end portion of the resistance heater is located within an engine combustion chamber.

The resistance heater includes a resistive heating element (made of a resistive heating wire or an electrically conductive ceramic material) with a positive temperature coefficient of resistance, so that the electrical resistance of the heating element increases with temperature upon energization of the heater. When the energization of the resistance heater is started through the application of a constant power supply voltage, for example, the heating element is low in temperature and in resistance at the initial stage of energization so as to allow the passage of a relatively large electric current through the heater. As the heating element resistance increases with temperature, the energization of the heater is gradually limited. When the temperature distribution of the heating element comes to equilibrium, the heater resistance becomes substantially constant. The heater temperature then reaches saturation.

Under actual usage conditions of the glow plug, however, the heating end portion of the heater in the combustion chamber is cooled due to various external factors, such as fuel injection and swirl, after starting of the engine. When the heating end portion of the heater is cooled, the heater resistance decreases to cause current fluctuations. The minimization of such heater resistance changes is important to attain a stable heating state of the heater, because the amount of heat generated by the heater is in proportion to the square of the electric current applied. In order to limit the heater resistance to within a predetermined range, it is conceivable to employ a control process in which heater energization power is adjusted according to a difference between a current heater resistance value and a target heater resistance value. (Hereinafter, this control process is referred to as a "resistance control process".) The stabilization of the heating state of the heater by keeping the heater resistance within a predetermined range has great significance for effective engine startability improvement and emission reduction.

In the resistance control process, the accuracy of measuring the heater resistance is an important parameter to obtain an improvement in control stability. The temperature of the front end portion of the resistance heater in the engine combustion chamber is readily changed due to various external factors including fuel injection and swirl as mentioned above. Although the heater resistance varies in response to such temperature changes, the heater resistance has to be measured accurately. There is a certain time lag until the cooling of a surface of the heater becomes reflected through the temperature distribution of the heating element within the heater. If this time lag is large, an instability phenomenon such as overshooting, undershooting or hunting of the heater resistance is likely to occur even though the heater resistance should be kept constant.

It is further conceivable to employ a mounting method by which the glow plug is mounted in such a manner that a rear end portion of the resistive heating element of the resistance heater is hidden in a mounting hole of the engine block. In this case, there arises a large difference in the influence of the cooling delay between the portion of the resistive heating element hidden in the mounting hole and the portion of the resistive heating element located in the combustion chamber without being hidden in the mounting hole. This can result in the occurrence of the above instability phenomenon in the resistance control process.

It has been recently desired that the glow plug have the capability of reaching a saturation temperature in a minimal time, called quick heating performance, for engine startability improvement. For example, Japanese Laid-Open Patent Publication No. 59-60125 discloses a glow plug having a heating coil and a control coil made of a material having a larger positive temperature coefficient of resistance than that of the heating coil and connected in series with the heating coil within the sheath tube, so as to increase its quick heating performance and to prevent excessive increases in the coil temperature. This disclosed type of glow plug is generally mounted with the front-end-side heating coil protruding in the combustion chamber and the rear-end-side control coil being located in the plug hole. The control coil is low in temperature and in electrical resistance at the initial stage of energization, so that the heating coil receives a relatively large electric current to cause a rapid rise in temperature. As the heating coil temperature rises, the control coil becomes heated by such a temperature rise to increase in electrical resistance and thereby limit the passage of electric current through the heating coil. Accordingly, the heater attains a temperature-rise characteristic in which the temperature of the heating coil rises rapidly in the initial stage of energization, and then, reaches saturation under the energization current limiting action of the control coil. In the case of applying the resistance control process to the above type of glow plug, the control coil having a large temperature coefficient of resistance shows a large resistance change in response to heater cooling. However, the resistance control of the control coil in the plug hole follows on temperature changes of the heating coil in the combustion chamber. This can results in a problem that defective conditions are particularly likely to occur due to the cooling delay of the control coil.

DISCLOSURE OF THE INVENTION

It is therefore an object of the present invention to provide a glow plug energization control device for controlling energization of a resistance heater of a glow plug by a resistance control process, attaining good resistance control response under cooling of the heater by fuel injection and combustion gas, and stably controlling the amount of heat generated by the heater. It is also an object of the present invention to provide a glow plug for use with such an energization control device.

In order to achieve the above object, there is provided according to a first aspect of the present invention a control device for a glow plug, the glow plug comprising a resistance heater extending axially of the glow plug, including a resistive heating element that has a ratio R1000/R20 of electrical resistance R1000 at 1000° C. to electrical resistance R20 at 20° C. of 6 or larger and being mounted in an engine block with a front end portion of the resistance heater and at least part of the resistive heating element protrudingly located in an engine combustion chamber, the control device being configured to control energization of the resistance heater in a steady control mode to adjust electrical power supplied to the resistance heater in such a manner as to keep a resistance of the resistance heater within a predetermined range.

The resistive heating element is directly and promptly influenced by the cooling of the heater due to fuel injection and combustion gas in the above arrangement, as the resistive heating element has such a large positive temperature coefficient of resistance as to achieve a ratio R1000/R20 of 6 or higher and at least partly protrudes in the engine combustion chamber. The resistance of the resistive heating element varies quickly and greatly in response to heater cooling. It is thus possible to adjust the electrical power supplied to the heater to its target value promptly and properly and thereby possible to stably maintain the amount of heater generated by the heater. In addition, defective conditions such as temperature changes in the heater according to the speed of combustion gas colliding with the heater surface become unlikely to occur.

Hereinafter, additional requirements for the first aspect of the present invention will be explained.

The glow plug control device can control the energization of the resistance heater in the steady control mode through the use of a semiconductor switch connected in series with the resistive heating element. Although a mechanical switch such as a relay switch may be used to control the energization of the heater, the semiconductor switch allows ON-OFF control at closer intervals than those of the mechanical switch. This makes it possible to control the energization of the heater with high accuracy in response to quick changes in the heater resistance and to keep the resistance of the heater of the glow plug within the predetermined range effectively. Examples of the semiconductor switch include a FET, a thyristor, a GTO, an IGBT and the like.

The energization control of the heater in the steady control mode can be performed by a PWM (Pulse Width Modulation) control method in which the duty ratio is determined according to a difference between the measured heater resistance value and target heater resistance value. This makes it possible to control the heater resistance stably based on the comparison between the measured resistance value and target resistance value.

Further, the resistance heater preferably includes a cylindrical sheath tube having a closed front end to which the resistive heating element is connected. As the resistive heating element is installed in the sheath tube and connected with the front end of the sheath tube, it is possible to arrange the resistive heating element easily in the combustion chamber at the occasion of mounting the glow plug on the engine block with the resistance heater being protrudingly located in the combustion chamber.

When the resistance heater with the above resistive heating element receives a power supply voltage, the resistive heating element is low in temperature and in resistance at the initial stage of energization so that a relatively large inrush current passes through the resistive heating element and then through the mechanical switch or semiconductor switch connected in series with the resistive heating element. This can result in adhesion of the mechanical switch or breakage of the semiconductor switch.

Thus, the resistance heater preferably includes an inrush current limiting resistor connected in series with the rear end of the resistive heating element so as to reduce an inrush current through the resistive heating element. As the inrush current limiting resistor is connected in series with the rear end of the resistive heating element, the composite resistance of the resistive heating element and the inrush current limiting resistor becomes increased to limit the passage of a large current through the resistive heating element at the initial stage of energization. This makes it possible to prevent the adhesion of the mechanical switch or the breakage of the semiconductor switch. In view of the resistance characteristic of the resistive heating element, the resistance of the inrush current limiting resistor can be selected appropriately so as to prevent the adhesion of the mechanical switch or the breakage of the semiconductor switch. It is however desirable to select the resistance of the inrush current limiting resistor in such a manner that the composite resistance R20 of the resistive heating element and the inrush current limiting resistor at 20° C. becomes 100 mΩ or higher, for the reason that the power supply voltage is normally 12 V.

Examples of the inrush current limiting resistor includes those being made of a material having a smaller ratio R1000/R20 of electrical resistance R1000 at 1000° C. to electrical resistance R20 at 20° C. than that of the resistive heating element. This makes it possible to increase the amount of heat generated by the resistive heating element in the front end side of the resistance heater and thereby possible to preheat the inside of the engine combustion chamber effectively.

The resistive heating element and the inrush current limiting resistor may be in the form of coil members where the wire diameter of the inrush current limiting resistor is larger than that of the resistive heating element. This also makes it possible to increase the amount of heat generated by the resistive heating element in the front end side of the resistance heater and thereby possible to preheat the inside of the engine combustion chamber effectively.

The resistance heater preferably includes a cylindrical sheath tube closed at a front end thereof, the above resistive heating element and another heating element connected at front and rear ends thereof with the front end of the sheath tube and the resistive heating element, respectively, and having a positive temperature coefficient of resistance and a smaller ratio R1000/R20 of electrical resistance R1000 at 1000° C. to electrical resistance R20 at 20° C. than that of the resistive heating element.

When the resistance heater includes the resistive heating element and the heating element arranged on the front end side of the resistive heating element and having a smaller ratio R1000/R20 of electrical resistance R1000 at 1000° C. to electrical resistance R20 at 20° C. than that of the resistive heating element, as described above, with the resistive heating element being protrudingly located in the combustion chamber, the resistance of the resistive heating element varies quickly and greatly in response to heater cooling. It is thus possible to adjust the electrical power supplied to the heater to its target value promptly and properly and thereby possible to stably maintain the amount of heater generated by the heater. It is further possible to preheat the inside of the engine combustion chamber effectively, as the amount of heat generated by the resistive heating element in the front end side of the resistance heater becomes increased.

Preferably, the whole of the resistive heating element is protrudingly located in the engine combustion chamber so that the resistive heating element becomes influenced by the cooling of the heater due to fuel injection and combustion gas efficiently and promptly. The resistance of the resistive heating element varies more quickly in response to heater cooling. It is thus possible to adjust the electrical power supplied to the heater to its target value more promptly and properly and thereby stably maintain the amount of heater generated by the heater.

The resistance control process is always excellent in the stability to disturbance under the condition that the heater temperature is saturated. However, the following problems are likely to occur in the resistance control process under the condition that the heater temperature is not saturated, i.e., the heater is in the transient temperature rise phase after the start of energization. In the transient temperature rise phase, the heater is low in temperature and in resistance. On condition that the resistance control process is applied, a lower heater resistance means a larger deviation from the target resistance value at which the heater resistance should be kept at the saturation temperature. In order to adjust the heater resistance to the target value promptly, a larger amount of electrical power is supplied to the heater to accelerate the temperature rise of the heater. Under such a low resistance condition where the heater temperature has not risen sufficiently, however, the heater primarily allows the passage of a large electric current therethrough. The heater temperature becomes increased too rapidly under the resistance control process, and then, overshoots the target saturation temperature grossly. Thus, defective conditions such as heater life shortening, heater wire breakage and sheath tube adhesion damage are likely to occur. Especially when the resistive heating element has such a large positive temperature coefficient of resistance as to achieve a ratio R1000/R20 of 6 or higher, preferably 7.5 or higher, and at least partly protrudes in the combustion chamber as in the present invention, the cooling of the resistive heating element due to fuel injection and combustion gas is rather accelerated to cause a further decrease in resistance upon starting of the engine in the transient temperature rise phase. It is thus said that the heater is more susceptible to excessive temperature increases under the resistance control process in the transient temperature rise phase.

In order to avoid the above problem, the duration of energization control in a transient control mode is desirably set, prior to starting the energization control in the steady control mode, in such a manner that the integral of power consumed for the duration of energization control in the transient control mode becomes smaller than that to be consumed when this duration of energization control in the transient control mode is substituted with a duration of energization control in the steady control mode.

The steady control mode is a mode of controlling the heater resistance to within a predetermined range, i.e., an energization control mode compliant with the resistance control process. The transient control mode is established before shifting to the steady control mode in the resistance control process, i.e., during the transient phase of temperature rise where the heater temperature (or resistance) has not yet been saturated. In this transient control mode, the integral of power supplied to the heater during the transient temperature rise phase is set smaller than that to be supplied to the heater under energization control by substitution of the steady control mode for the transient control mode. It is thus possible to prevent the overshooting of the heater temperature effectively.

It is also effective to set the duration of energization control in the transient control mode, prior to starting the energization control in the steady control mode, by the combination of an energization enabling period during which the energization of the resistance heater is enabled and an energization restricting period during which the energization of the resistance heater is more restricted than during the energization enabling period, in such a manner as to determined the ratio of the energization enabling period to the duration of energization control in the transient control mode in accordance with the incoming voltage to the resistance heater irrespective of the heater resistance.

When the resistance heater is in a temperature saturation state, the heating element has small fluctuations in the resistance. However, the temperature of surface portions of the heating element tends to be low in the transient temperature rise phase due to a temperature difference between the heating element and the insulating medium surrounding the heating element. The resistance distribution of the heating element is not uniform. This results in a decrease in the heater resistance measurement accuracy on which the resistance control process is premised. It is very likely that the overshooting of the heater resistance etc. will occur due to energization control destabilization. The transient control mode is thus defined as an energization control mode established by the combination of the energization enabling period during which the energization of the resistance heater is enabled and the energization restricting period during which the energization of the resistance heater is more restricted than during the energization enabling period (the energization enabling period may be zero) where the ratio of the energization enabling period to the duration of energization control in the transient control mode is determined in accordance with the incoming voltage to the resistance heater irrespective of the heater resistance. The resistance value measured with low accuracy in the transient temperature rise phase is not used as a parameter for heater energization power control. By determining the ratio of the energization enabling period to the duration of energization control in the transient control mode appropriately (e.g. uniquely) in accordance with the incoming voltage to the resistance heater, the overshooting of the heater temperature in the transient temperature rise phase can be prevented effectively. Even if the incoming voltage fluctuates during the duration of the transient control mode, it is therefore possible to supply an appropriate amount of electrical power to the resistance heater regardless of such voltage fluctuations and cause the heater to generate heat under desired conditions.

In the case of controlling the heater energization with the use of the switching element such as a FET, the energization enabling period and the energization restricting period can be set to a time period during which the switching element is in the ON state that allows the application of the incoming voltage to the heater and a time period during which the switching element is in the OFF state that interrupts the application of the incoming voltage to the heater, respectively.

In order to prevent excessive temperature increases in the resistance heater, the duration of energization control in the transient control mode may alternatively be set prior to starting the energization control in the steady control mode in such a manner as to limit $\delta R/R0$ to within a range of ±30% where $\delta R=R0-R1$; R0 is the target resistance value of the heater under energization control in the steady control mode; and R1 is the resistance value of the heater at the conclusion of energization control in the transient control mode.

The transient control mode is also applied to the transient phase of temperature rise before shifting to the steady control mode in this case, and set to prevent excessive temperature increases in the resistance heater on the premise that the electrical power supplied to the heater is limited to a lower degree as compared with the case where the steady control mode is applied to the transient temperature rise phase. This transient control mode is finished at the time when the heater resistance value R1 is brought near to the target resistance value R0 of the heater in the steady control mode in such a manner that δR/R0 falls within the range of ±30% (preferably ±10%). This makes it possible to prevent the overshooting of the heater temperature effectively in the transient temperature rise phase. The heater temperature becomes too high or too low at the conclusion of the transient control mode when δR/R0 deviates from the range of ±30%. In the former case, there arises a problem that, after shifting to the steady control mode, the heater temperature becomes so decreased that it takes too much time until the heater temperature stabilizes at the saturation temperature. In the latter case, there arises a problem that the overshooting of the heater temperature is likely to occur after shifting to the steady control mode.

In the transient control mode, the energization of the resistance heater can be controlled by the PWM control method in which the duty ratio is uniquely determined in accordance with the incoming voltage to the resistance heater. The PWM control method has the advantage of being able to adjust the electrical power supplied to the resistance heater easily according to the duty ratio. By setting the duty ratio uniquely to an appropriately limited value to the incoming voltage, the overshooting of the heater temperature can be prevented effectively in the transient temperature rise phase through a simple control process.

It is desirable to control the energization of the resistance heater in the transient control mode in such a manner that the integral of power consumed throughout the duration of energization control in the transient control mode falls within a predetermined range. When the integral consumption of power throughout the duration of energization control in the transient control mode is fixed, it is possible to prevent excessive overshooting of the heater temperature during the transient temperature rise phase due to the oversupply of electrical power and overshooting of the heater temperature after shifting to the steady control mode due to the short supply of electrical power effectively. If the incoming voltage to the resistance heater fluctuates under the transient control mode, it is effective to adjust the average level of voltage applied to the resistance heater so that the integral of power consumed throughout the duration of energization control in the transient control mode falls within a predetermined range. In the case of applying the PWM control method, this average applied voltage level can be easily adjusted by setting the duty ratio. Namely, when the incoming voltage to the resistance heater fluctuates under the transient control mode, it is desirable to control the energization of the resistance heater by the PWM control method where the duty ratio is corrected in response to fluctuations in the incoming voltage.

The duration of energization control of the resistance heater in the transient control mode may be finished at the time e.g. when a fixed time period has elapsed. In the case of employing the method in which the ratio of the energization enabling period to the duration of energization control in the transient control mode is changed for power regulation, the integral of power supplied to the heater under the transient control mode is adjusted adequately even when the duration of the transient control mode is fixed as described above. This allows a lessening of control steps as the energization control duration is simply finished according to whether the fixed time period has elapsed.

The energization control of the resistance heater in the transient control mode may alternatively be finished at the time when the measured resistance of the resistance heater has reached a predetermined value. This makes it possible to lead the heater temperature to the saturation temperature smoothly after shifting to the steady control mode, as the transient control mode is completed on the condition that the heater resistance has been brought near to a desired level. In this case, it is appropriate to check whether the heater resistance has reached a set target resistance value, or check whether the variation between a plurality of resistance values (e.g. two resistance values) measured at given sampling intervals falls within a predetermined range (whether the heater resistance has been saturated at the conclusion of the transient control mode).

Prior to the duration of the transient control mode, the energization of the resistance heater may be controlled in a preheating mode in which average heater energization power is set larger than that in the transient control mode. By setting the duration of energization in the preheating mode in this way, it is possible to lead the heater to the saturation temperature in a shorter time. There is a possibility that the incoming voltage of the resistance heater also fluctuates under the preheating mode. In this case, the deterioration in quick heating performance due to short power supply and the overshooting of the heater temperature due to excessive preheating can be prevented effectively when the energization of the resistance heater in the preheating mode is finished at the time the integral of power supplied to the resistance heater in the preheating mode has reached a given value, and then, the heater is subsequently energized in the transient control mode.

There is provided according to a second aspect of the present invention a control device for a glow plug, the glow plug comprising a resistance heater extending axially of the glow plug, including a first resistive heating element and a second resistive heating element connected in series with the first resistive heating element and having a larger positive temperature coefficient of resistance than that of the first resistive heating element and being mounted in an engine block with a front end portion of the resistance heater and at least part of the second resistive heating element protrudingly located in an engine combustion chamber, the control device being configured to control energization of the resistance heater in a steady control mode to adjust electrical power supplied to the resistance heater in such a manner as to keep a resistance of the resistance heater within a predetermined range.

When the resistance heater includes the first resistive heating element and the second resistive heating element having a larger positive temperature coefficient of resistance than that of the first resistive heater, as described above, with at least part of the second resistive heating element protruding in the engine combustion chamber, the second resistive heating element is directly and promptly influenced by the cooling of the heater due to fuel injection and combustion gas. Because of a large positive temperature coefficient of resistance, the resistance of the second resistive heating element varies quickly and greatly in response to heater cooling. It is thus possible to achieve effective functioning of the steady control mode so as to keep the heater resistance within the predetermine range. The effective functioning of the steady control mode also allows the effective prevention of defective conditions such as temperature changes in the heater according to the speed of combustion gas colliding with the heater surface.

There is further provided according to still another aspect of the present invention a glow plug for use with the above control devices, comprising a cylindrical sheath tube with a closed front end, a resistive heating element arranged in the sheath tube in connection with the front end of the sheath tube and having a ratio R1000/R20 of electrical resistance R1000 at 1000° C. to electrical resistance R20 at 20° C. of 6 or larger, preferably 7.5 or larger, and an inrush current limiting resistor connected in series with a rear end of the resistive heating element and having a positive temperature coefficient of resistance and a smaller ratio R1000/R20 of electrical resistance R1000 at 1000° C. to electrical resistance R20 at 20° C. than that of the resistive heating element.

The resistive heating element is directly and promptly influenced by the cooling of the heater due to fuel injection and combustion gas, when the resistive heating element of the glow plug has a ratio R1000/R20 of 6 or larger and at least partly protrudes in the engine combustion chamber. The resistance of the resistive heating element varies quickly and greatly in response to heater cooling. It is thus possible to adjust the electrical power supplied to the heater to its target value promptly and properly and thereby possible to stably maintain the amount of heater generated by the heater.

As the resistive heating element is installed in the sheath tube in connection with the front end of the sheath tube, it is possible to arrange the resistive heating element easily so as to protrude in the combustion chamber at the occasion of mounting the glow plug on the engine block with the resistance heater being protrudingly located in the combustion chamber.

When the inrush current limiting resistor is connected in series with the rear end of the resistive heating element, the composite resistance of the resistive heating element and the inrush current limiting resistor becomes increased to limit the passage of a large current through the resistive heating element at the initial stage of energization. This makes it possible to prevent adhesion of the mechanical switch or breakage of the semiconductor switch. In view of the resistance characteristic of the resistive heating element, the resistance of the inrush current limiting resistor can be selected appropriately so as to prevent the adhesion of the mechanical switch or the breakage of the semiconductor switch. It is however desirable to select the resistance of the inrush current limiting resistor in such a manner that the composite resistance R20 of the resistive heating element and the inrush current limiting resistor at 20° C. becomes 100 mΩ or higher, for the reason that the power supply voltage is normally 12 V.

Preferably, the inrush current limiting resistor has a smaller ratio R1000/R20 of electrical resistance R1000 at 1000° C. to electrical resistance R20 at 20° C. than that of the resistive heating element. This makes it possible to increase the amount of heat generated by the resistive heating element on the front end side of the resistance heater and thereby possible to preheat the inside of the engine combustion chamber effectively.

BRIEF DESCRIPTION OF DRAWINGS

FIG. 10 is a table showing a relationship between ΔR and duty ratio in the steady control mode.

FIG. 11 is a table showing a relationship between ΔR and duty ratio in the steady control mode where the incoming voltage fluctuates.

FIG. 12 is a table showing a relationship between ΔR and duty ratio correction factor in the steady control mode.

FIG. 13 is a table showing a relationship between incoming voltage and duty ratio in the transient control mode.

FIG. 14 is a table showing a relationship between incoming voltage and preheating time in the preheating mode.

BEST MODES FOR CARRYING OUT THE INVENTION

Hereinafter, exemplary embodiments of the present invention will be described in detail with reference to the drawings.

A first embodiment of the present invention will be explained.

Figure 2:
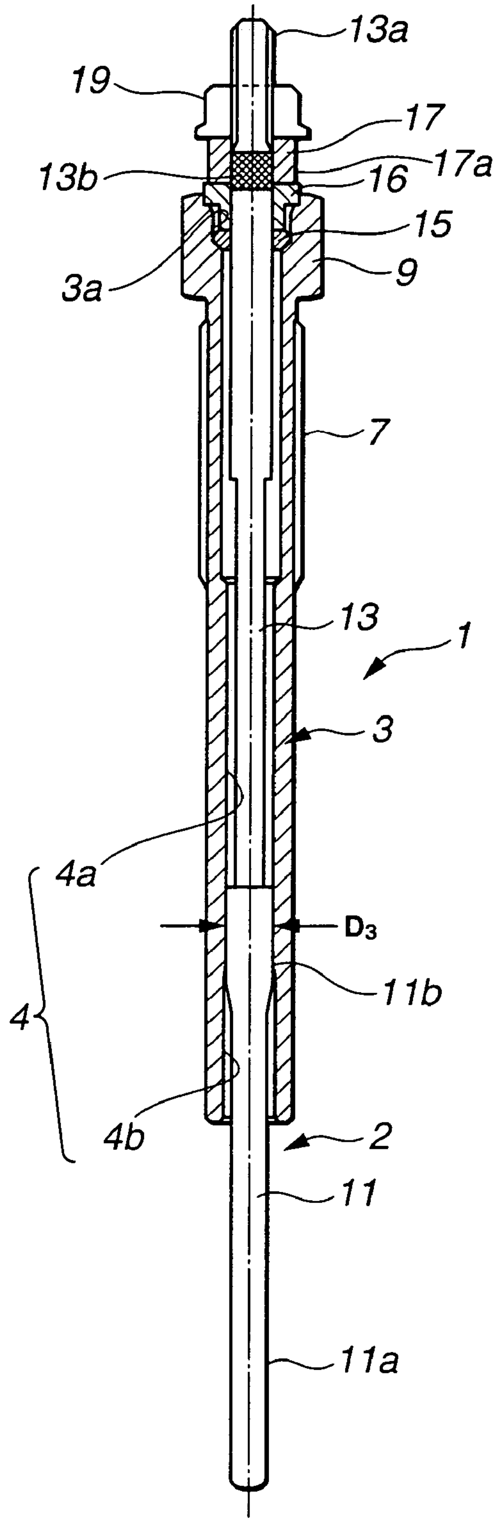
FIG. 2 is a partial section view of a glow plug according to the first embodiment of the present invention.
Figure 3A:
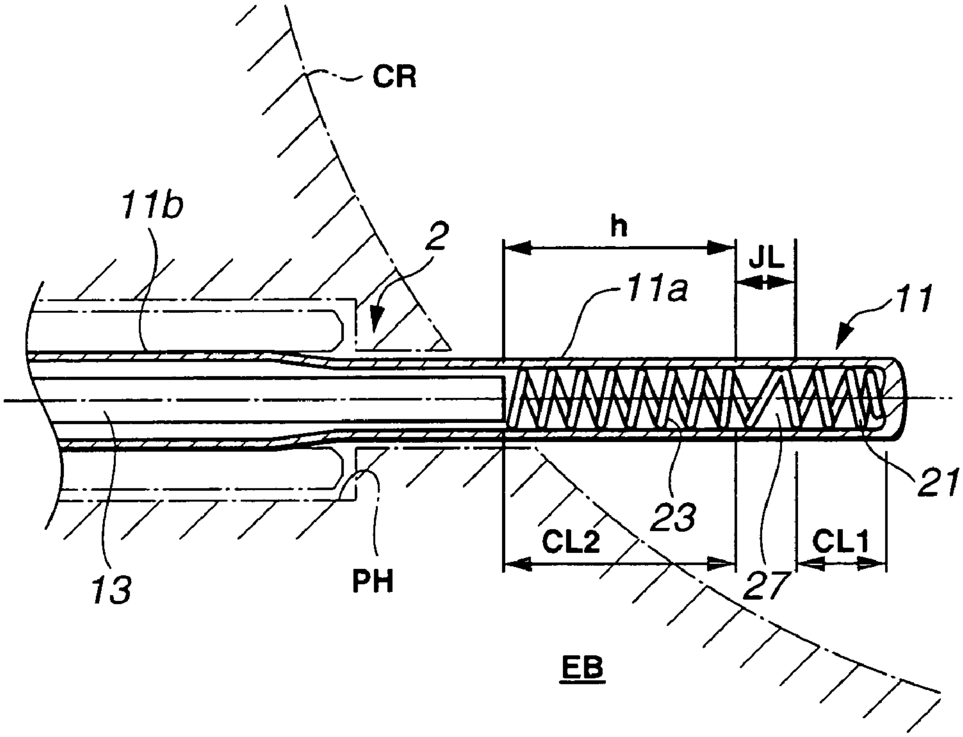
FIG. 3A is a section view of a sheath heater of the glow plug of FIG. 2.
Figure 3B:
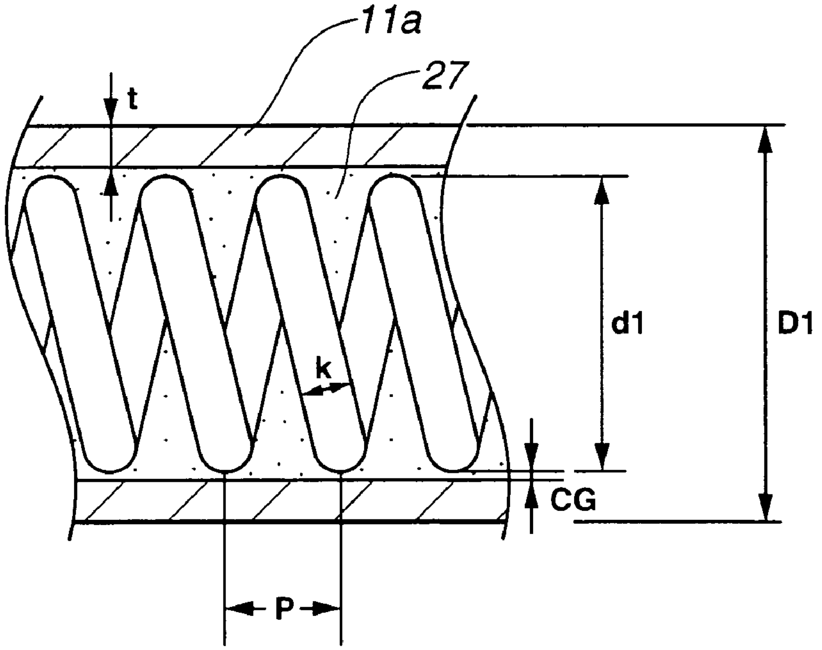
FIG. 3B is a partial enlarged view of an inner structure of the sheath heater of FIG. 2.

FIG. 2 is a schematic view of a glow plug according to the first embodiment of the present invention. FIG. 3A is a section view of a sheath heater of the glow plug of FIG. 2, and FIG. 3B is a partial enlarged view of an inner structure of the sheath heater of FIG. 3A. A glow plug 1 includes a sheath heater 2 as a resistance heater and a metallic shell 3 disposed around the sheath heater 2. The sheath heater 2 has a sheath tube 11 with a closed front end, a plurality of resistive wire coils, e.g., two resistive wire coils in the first embodiment including a heating coil 21 (as a first resistive heating element: heating element) located on the front end side and a control coil 23 (as a second resistive heating element: resistive heating element) located on the rear end side in series connection with the heating coil 21, and an electrically insulating material of magnesia powder 27 with which these coils 21 and 23 are sealed in the sheath tube 11 as shown in FIG. 3A. As shown in FIG. 2, a body 11*a* of the sheath tube 11 installing therein the coil members (heating coil 21 and control coil 23) has a front end portion protruding from the metallic shell 3 to form a protruding portion.

A front end of the heating coil 21 is electrically connected with the sheath tube 11, as shown in FIG. 3A, while outer surfaces of the heating coil 21 and the control coil 23 are electrically insulated from an inner surface of the sheath tube 11 by means of the magnesia powder 27. The heating coil 21 can be made of e.g. a material having a specific electrical resistance R20 of 80 to 200 μΩ·cm at 20° C. and a ratio R1000/R20 of 0.8 to 3 where R1000 is a specific electrical resistance at 1000° C., and more specifically, a Fe—Cr alloy or a Ni—Cr alloy. The control coil 23 can be made of e.g. a material having a specific electrical resistance R20 of 5 to 20 μΩ·cm at 20° C. and a ratio R1000/R20 of 6 or larger where R1000 is a specific electrical resistance at 1000° C., and more specifically, a Ni metal, a Co—Fe alloy or a Co—Fe—Ni alloy. There can be used a Co-25Fe-4Ni alloy as a material having a ratio R1000/R20 of 7.5 or larger. The heating coil 21 and the control coil 23 are adjusted in such a manner as to achieve an electrical resistance ratio (RH/RC)RT of 1 or larger at room temperature and an electrical resistance ratio (RH/RC)1000 of 0.1 to 0.4 at 1000° C. where RH is an electrical resistance of the heating coil 21 and RC is an electrical resistance of the control coil 23.

The glow plug 1 further includes a rod-like energization terminal shaft 13 inserted into the sheath tube 11 from the rear end side and having a front end connected to a rear end of the control coil 23 by e.g. welding and a rear end formed with a male thread portion 13*a* as shown in FIG. 2. The metallic shell 3 is formed into a cylindrical shape to have an axially extending through hole 4, and the sheath heater 2 is inserted and fixed into the through hole 4 with the front end of the sheath tube 11 protruding from one open end of the metallic shell 3 by a predetermined length. A tool engaging portion 9 of hexagonal cross section is formed on an outer surface of the metallic shell 3 to engage thereon a tool, such as a torque wrench, for mounting the glow plug 1 on the engine block EB of a diesel engine. A mounting screw-thread portion 7 is formed adjacent to the tool engaging portion 9.

The through hole 4 of the metallic shell 3 includes a large diameter portion 4*b* on the open end side from which the sheath tube 11 protrudes and a small diameter portion 4*a* located adjacent to the large diameter portion 4*b*. A large diameter rear end portion 11*b* of the sheath tube 11 is press-fitted and secured in the small diameter portion 4*a*. A spot-facing portion 3*a* is formed in the opposite open end side of the through hole 4 so that a rubber O-ring 15 and an insulation bushing (made of e.g. nylon) 16 are fitted around the energization terminal shaft 13 and engaged in the spot-facing portion 3*a*. In order to prevent the insulating bushing 16 from falling off, a holding ring 17 is fitted around the energization terminal shaft 13 on the rear end side of the insulating bushing 16. The holding ring 17 is fixed to the energization terminal shaft 13 by a caulking portion 17*a* formed in an outer surface of the holding ring 17. The energization terminal shaft 13 has a knurl portion 13*b* formed thereon at a position corresponding to the caulking portion 17*a* to increase caulking joint strength. Herein, reference numeral 19 denotes a nut for fixing a power supply cable to the energization terminal shaft 13.

The glow plug 1 is mounted in a plug hole PH of the engine block EB by means of the screw-thread portion 7 of the metallic shell 3 in such a manner that the front end portion of the sheath heater 2 protrudes into an engine combustion chamber CR by a predetermined length. The control coil 23 as the second resistive heating element partly protrudes in the engine combustion chamber CR as shown in FIG. 3. The whole of the heating coil 21 is located within the engine combustion chamber CR, since the heating coil 21 as the first resistive heating element is connected in series with the front end of the control coil 23.

The length h by which the control coil 23 protrudes in the engine combustion chamber CR is adjusted to 3 mm or longer. Further, the protrusion length h is generally adjusted to 10 mm or shorter. In the present specification, the protrusion length h is defined as a length of coil center axis, beginning at the three-dimensional geometric barycenter of a plug hole opening portion of the combustion chamber CR. If the plug hole opening portion is tapered or radially expanded by spot-facing, the bottom edge of the plug hole opening portion is defined as a plug hole opening edge. In the case where the whole of the control coil 23 is located outside the plug hole, the total length of the control coil 23 is set as the protrusion length h.

The results of tests to determine the effects of the above glow plug mounting method by which the control coil 23 protrudes in the engine combustion chamber will be explained below. The specifications of test samples of the respective coils 21 and 23 are as follows.

(Heating Coil 21)

Material: iron-chromium alloy (composition: Al=7.5 wt %; Cr=26 wt %; and Fe=the balance)

Dimensions: coil wire thickness k=0.3 mm, coil axial length CL1=2 mm, coil outside diameter d1=2 mm, pitch P=0.8 mm, R20=0.25Ω, and R1000/R20=1 (cf. FIG. 3B)

(Control Coil 23)

Material: cobalt-nickel-iron alloy (composition: Ni=25 wt %; Fe=4 wt %; and Co=the balance)

Dimensions: coil wire thickness k=0.22 mm; coil axial length CL2=3 mm; coil outside diameter d1=2 mm; pitch P=0.8 mm; R20=0.1Ω; and R1000/R20=9 (cf. FIG. 3B)

(RH/RC)RT: 2.5

(RH/RC)1000: 0.28

(Coil-to-Coil gap 25): JL=2 mm (Sheath Tube 11)

Material: SUS310S

Dimensions: body outside diameter D1=3.5 mm; wall thickness t=0.5 mm; t/D1=0.14 mm; and body-to-coil distance CG=0.25 mm (cf. FIG. 3B)

The test samples of the heating coil 21 and the control coil 23 were fitted to a test plug hole formed in a carbon-steel block. The length (corresponding to "h" in FIG. 3A) by which the control coil 23 protruded from the block surface (corresponding to the combustion chamber surface) was adjusted to 3 mm in Example and 0 mm in Comparative Example. The portion of the sheath heater protruding from the block surface was placed in no airflow and was supplied with air flow at 4 m/s (low airflow) and at 6 m/s (high airflow) by a blower. The sheath heater was then energized in the after-mentioned steady control mode by a PWM control method while varying the target resistance value. The resistance of the sheath heater was measured using the current and voltage applied to the sheath heater. The heater saturation temperature was measured by a thermocouple in contact with a surface of the sheath tube.

Figure 15:
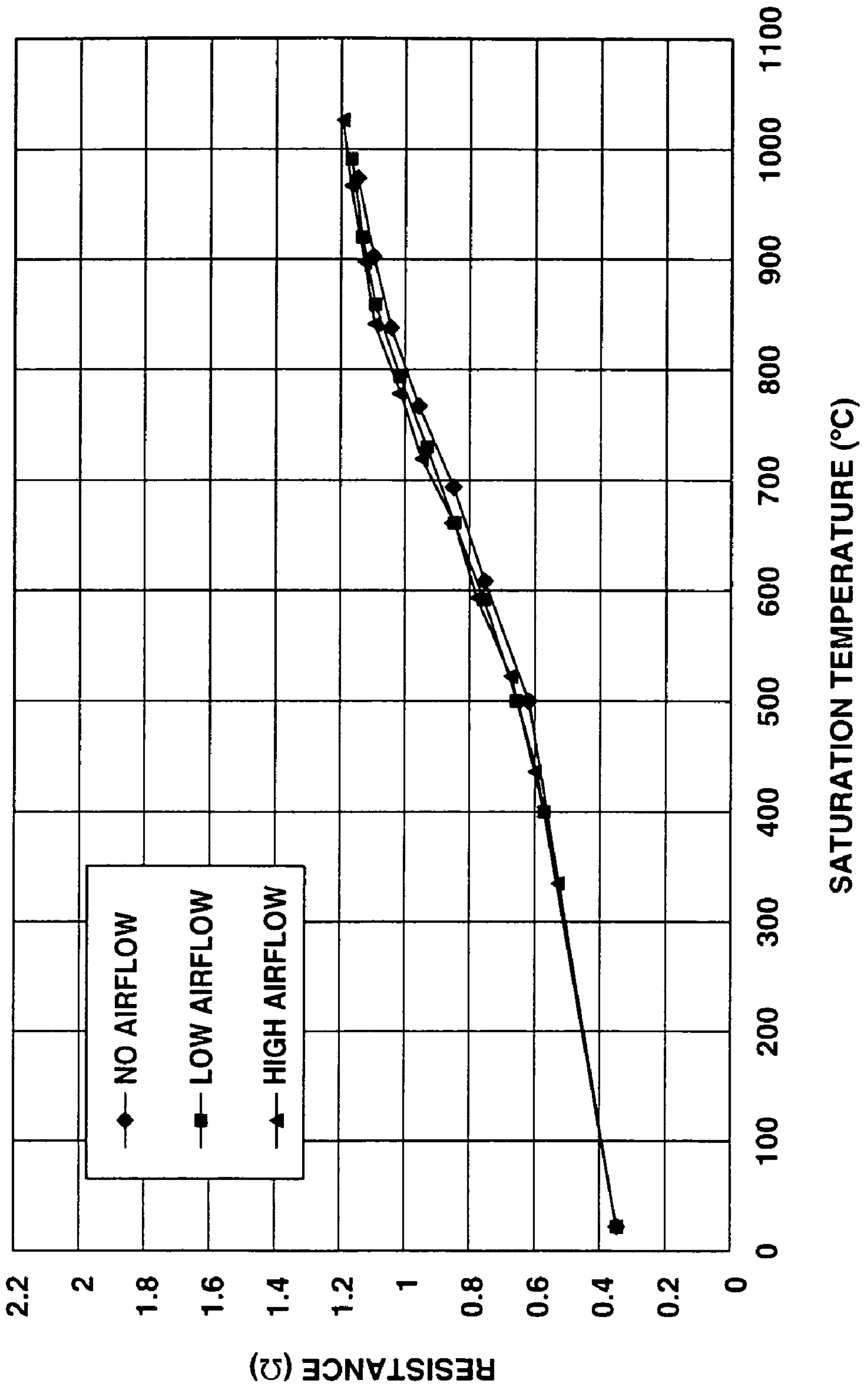
FIG. 15 is a graph showing test results of example to verify the effects of the present invention.
Figure 16:
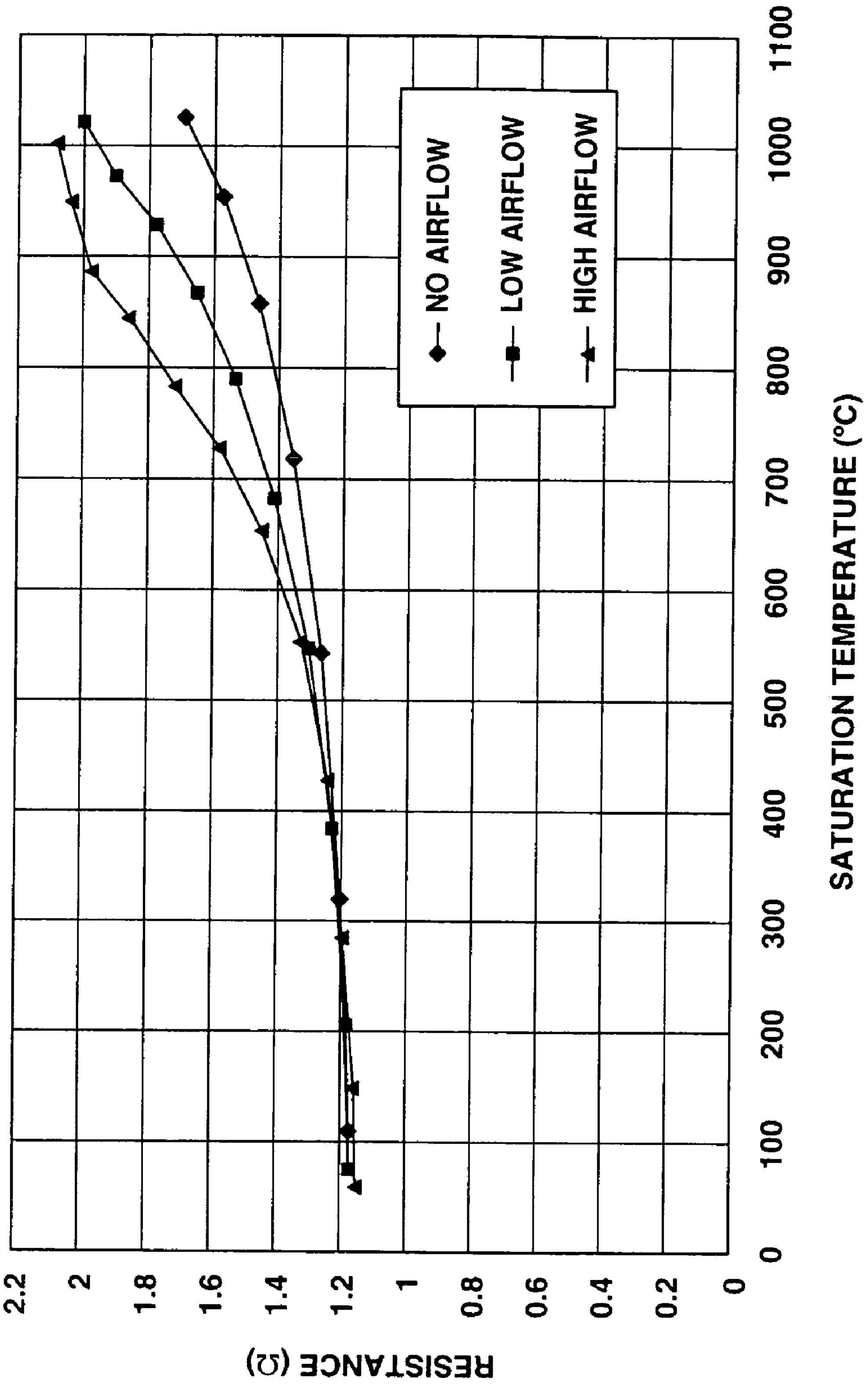
FIG. 16 is a graph showing test results of comparative example.

FIG. 15 is a plot of the test results of Example, and FIG. 16 is a plot of the test results of Comparative Example. In Example of FIG. 15, the plotted points of the relationships between resistance and saturation temperature under no airflow, low airflow and high airflow are fitted to one curved line, so that the heater saturation temperature is uniquely defined with respect to the resistance. This means that the resistance value of the control coil 23 varies quickly and responsively even under the influence of cooling due to combustion gas etc. for stable resistance control. On the other hand, the relationships between resistance and saturation temperature under no airflow, low airflow and high airflow shows different tendencies in Comparative Example of FIG. 16, so that the heater saturation temperature does not always become uniform even at the same resistance. It is thought that the resistance value of the control coil 23 does not vary responsively since the control coil 23 is wholly embedded in the engine block and thereby becomes less sensitive to cooling.

Figure 1:
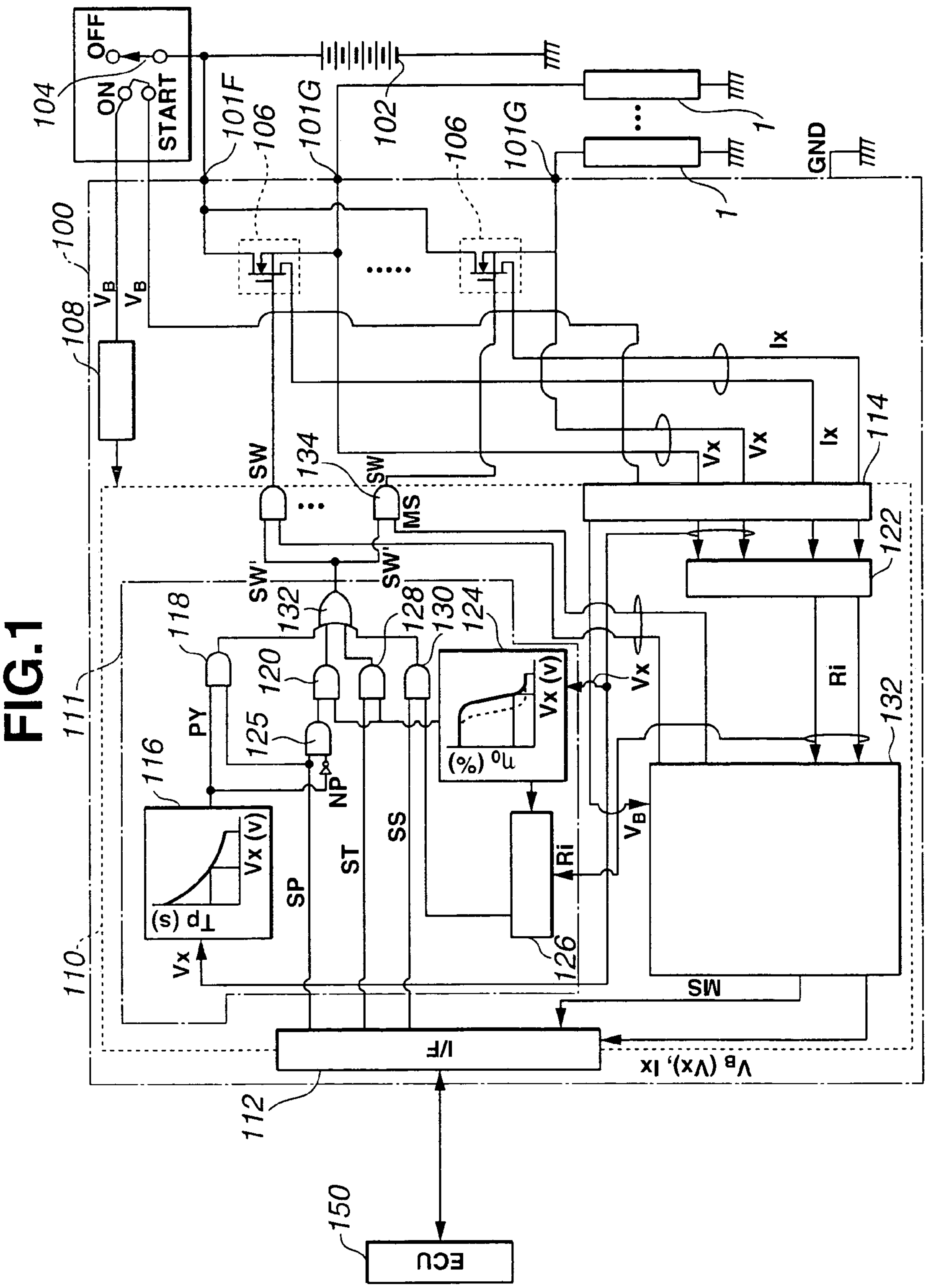
FIG. 1 is a block diagram showing the electric configuration of a glow plug control device according to a first embodiment of the present invention.

Next, FIG. 1 is a block diagram showing the electric configuration of a glow plug control device 100 according to the first embodiment. The control device 100 has a main control unit 10. In FIG. 1, each functional element of the main control unit 110 is illustrated in a hardware logic form. The operations of the main control unit 110 will be thus explained below according to hardware logic in the present embodiment, but the equivalent functions can be achieved by software using a microcomputer.

As shown in FIG. 1, the main control unit 10 receives an operating voltage for signal processing through a stabilized power supply 108 (regulator). The stabilized power supply 108 receives power from a battery 102 through a key switch 104. When the key switch 104 is OFF, the supply of power to the stabilized power supply 108 is shut off to stop the operations of the main control unit 110. The voltage VB (normally 12 V) of the battery 102 (hereinafter referred to as a "battery voltage") is fed from a battery terminal 101F to the sources of a plurality of FET 106 as semiconductor switches in the control device 100. The drain of each FET 106 is connected with the energization terminal shaft of the glow plug 1 via a plug terminal 101G for energization of the sheath heater 2 of the glow plug 1. A switching signal SW from the main control unit 110 is input into the gate of each FET 106 so as to turn on and off the energization of the sheath heater 2 of the glow plug 1. In the present embodiment, a FET with a current detection function (available under the registered trademark of "PROFET" from Infineon Technologies AG) is used as FET 106.

The main control unit 110 has an A/D converter 114 to receive the following input signals.

(1) Battery voltage VB: In the present embodiment, the battery voltage VB is input from the upstream side of the path of electrical power supply to FET 106. Although not shown in the drawings, the battery voltage VB may be divided/regulated appropriately and then input into the A/D converter 114.

(2) Voltage Vx applied to each sheath heater 2 (hereinafter also referred to as a "plug applied voltage"): The plug applied voltage Vx is in the waveform of voltage switched by FET 106 and input from the drain side (or source side) of FET 106.

(3) Current Ix applied to each sheath heater 2 (hereinafter also referred to as a "plug applied current"): In the present embodiment, the current detection signal is output from FET 106 as mentioned above. Alternatively, the current detection signal may be obtained by providing a current detection resistor on the path of electrical power supply to the glow plug 1, and then, converting a voltage between opposite ends of the current detection resistor with a differential amplification circuit.

The plug applied voltage Vx and current Ix input into the main control unit 110 are digitized by the A/D converter 114 and output to a resistance calculating section 122. The resistance calculating section 122 calculates the resistance Ri of the sheath heater 2 (hereinafter referred to as a "heater resistance") from Vx/Ix. A peak value of PWM waveform (which equals to the battery voltage VB under normal energization) is used as the plug applied voltage Vx.

The battery voltage VB and the heater resistance Ri calculated by the resistance calculating section 122 are sent to a signal management section 132. The signal management section 132 is in communication with an engine controlling unit 150 (Engine Controlling Unit: hereinafter referred to as a "ECU") made up of a microcomputer, and has the following two functions.

(1) Signal transmission: Upon a request from ECU 150, the parameters necessary for heater energization control, such as the plug applied voltage Vx or battery voltage Vb and the heater resistance Ri, are output to ECU 150.

(2) Failure evaluation: A failure status signal (failure notification signal) indicative of a failure evaluation result is output to ECU 150 via an interface 112 e.g. when the heater resistance Ri exceeds a maximum resistance limit Rmax (due to heater wire breakage or FET output inability), when the heater resistance Ri is less than a minimum resistance limit Rmin (due to heater short or FET output terminal short) and when the battery voltage VB exceeds a maximum voltage limit VBmax.

The failure evaluation result (i.e. the failure status signal MS from the signal management section 132) is also used to stop or ignore the output of the switching signal SW to FET 106. In the present embodiment, the logical addition of a switching signal SW' from a switching signal generating section 111 to the failure status signal is determined by a diagnosis NAND gate circuit 134. When both of the switching signal SW' and the failure status signal are active, the switching signal SW is not output to FET 106 (i.e., the switching signal SW' is made invalid).

Then, ECU 150 outputs, into the switching signal generating section 111, a control command signal to command the mode in which the energization of the glow plug 1 (the sheath heater 2) is controlled.

Figure 4:
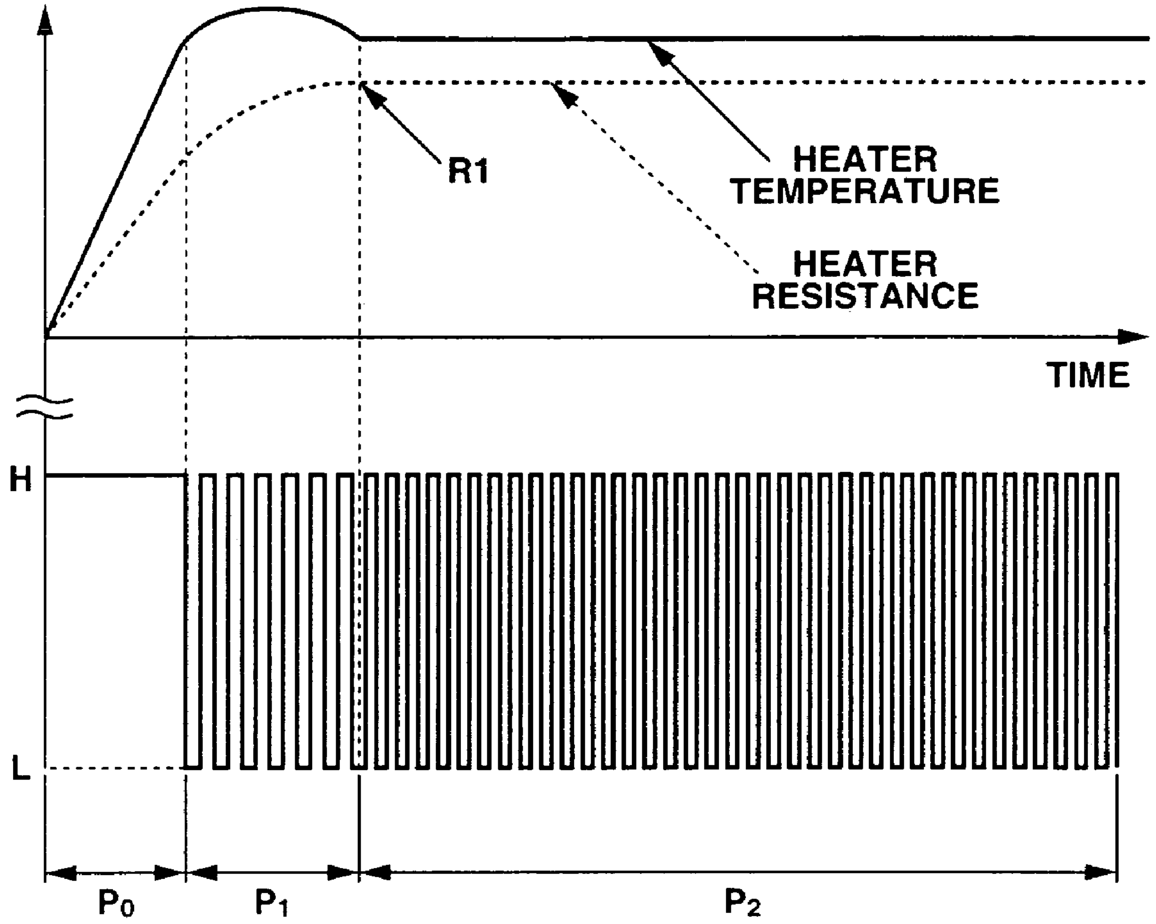
FIG. 4 is a schematic diagram showing a glow plug energization pattern according to the first embodiment of the present invention.

FIG. 4 is a diagram showing one example of the sequence of energization of the glow plug 1 performed by FET 106 of the main control unit 110 according to the control command signal from ECU 150 and how the resistance of the sheath heater 2 (i.e. the serial composite resistance of the heating coil 21 and control coil 23 in the present embodiment) and the temperature of the sheath heater 2 change over time. In FIG. 4, the temperature and resistance measured on the condition that the glow plug 1 is kept in a static room-temperature atmospheric environment without being mounted on the engine block EB are used. The energization is started in a preheating mode P0 and shifted to a transient control mode P1 and then a steady control mode P2 in the present embodiment. Under the transient control mode P1 and the steady control mode P2, the glow plug 1 is PWM-controlled by FET 106.

In the steady control mode P2, the energization is controlled by a resistance control process. Namely, the electrical power supplied to the sheath heater 2 is adjusted in the steady control mode P2 in such a manner as to keep the heater resistance Ri within a predetermined range. More specifically, the energization of the sheath heater 2 is PWM-controlled according to a duty ratio η by setting a target value $R_T$ against the heater resistance Ri and determining the duty ratio η based on a difference ΔR between the measured heater resistance Ri and the target value $R_T$ ($\Delta R = Ri - R_T$).

When the plug applied voltage Vx (the incoming voltage: the battery voltage VB can be substituted if failure evaluation is not performed) is held at a given standard value, an optimum duty ratio η may be set by experimentally determining duty ratios η necessary to adjust the heater resistance Ri to its target value $R_T$ experimentally with respect to various values ΔR, preparing a table or function showing a relationship between ΔR and duty ratio η as shown in FIG. 10, and referring to the prepared table or function on the actual value ΔR. However, there arise fluctuations in the plug applied voltage Vx. In this case, the duty ratio η can be determined by preparing and referring to a two-dimensional table (or bivariate function) showing a relationship of duty ratio η with Vx and ΔR. It is now assumed that the duty ratio is taken as ηs at ΔR=0. When ΔR is positive, the duty ratio is set smaller than ηs so as to decrease power input and thereby lower the resistance. When ΔR is negative, the duty ratio is set larger than ηs.

It is also practicable to give a reference duty ratio η0 according to the plug applied voltage Vx in such a manner that the input power W becomes constant even when the plug voltage Vx fluctuates. The final duty ratio η can be determined more easily using this reference duty ratio η0 upon correction of the reference duty ratio η0 based on the resistance difference ΔR. Namely, the heater input power W is expressed by:

$$W = Vm \cdot Im = (\eta 0 \cdot Vx)^2 / Ri \qquad (1)$$

in view of the fact that a time-average voltage Vm is expressed as η0·VB and a time-average current Im is expressed as Vm/Ri in the square switching voltage waveform under PWM control when the plug applied voltage is Vx; the duty ratio is h0; and the heater resistance is Ri. If the plug applied voltage Vx is a given standard value Vxa (e.g. the battery voltage of 11V) and the duty ratio is a given value ηa, the input power W equals to:

$$W = (\eta a \cdot Vxa)^2 / Ri \qquad (2).$$

Upon comparison of the equations (1) and (2), the reference duty ratio η0 is determined by:

$$\eta 0 = \eta a \cdot Vxa / Vx \qquad (3).$$

The final duty ratio η is then determined by:

$$\eta = \kappa \cdot \eta 0 \qquad (4)$$

where κ is a correction factor determined experimentally in advance according to the value of ΔR. The correction factor can be given as κ=1 when ΔR=0, κ<1 when ΔR>1, and κ>1 when ΔR<0, on the assumption that ηa corresponds to a value optimized to achieve ΔR=0.

Figure 9:
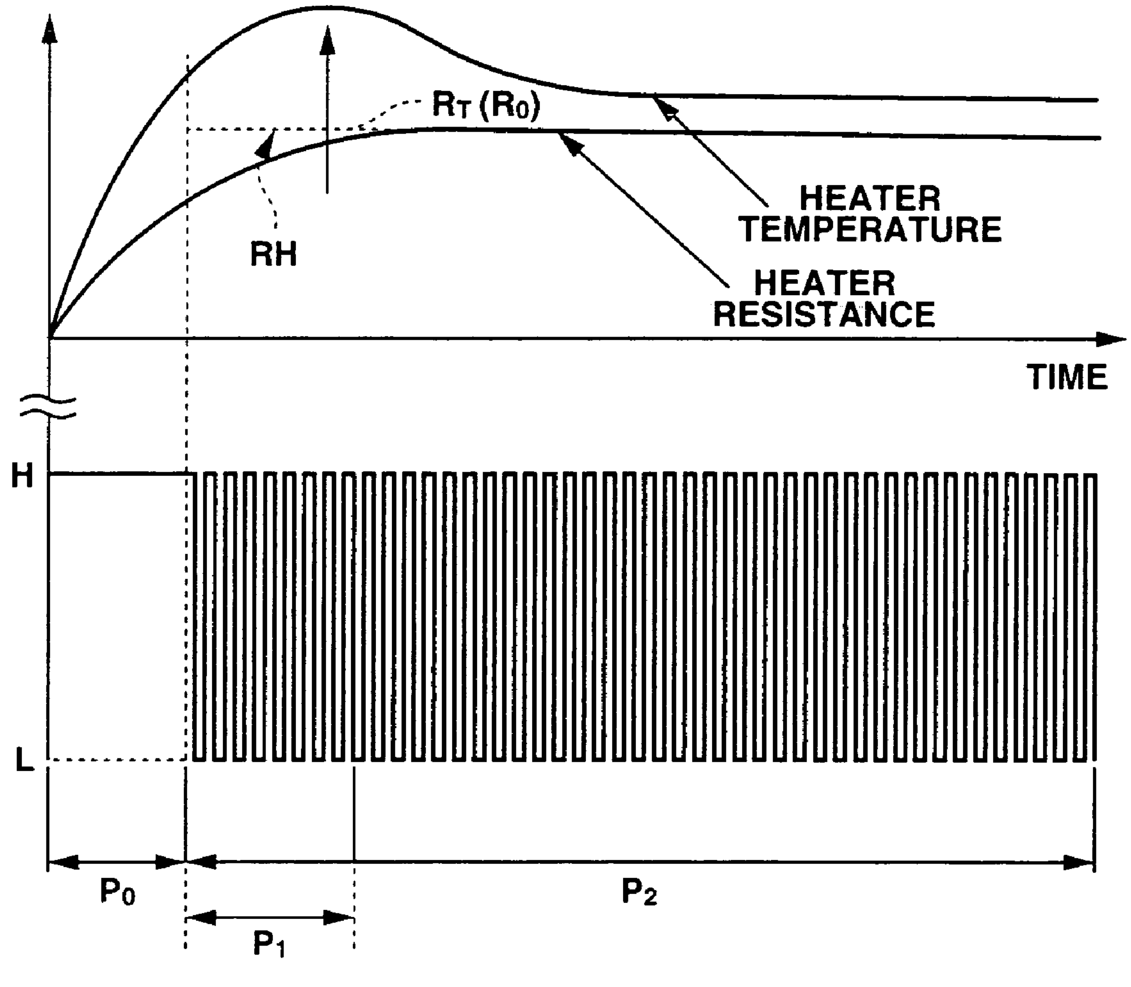
FIG. 9 is a schematic diagram showing a glow plug energization pattern according to the earlier technology and a problem arising therefrom.

Referring back to FIG. 4, the transient control mode P1 is an energization control mode conducted, before shifting to the steady control mode P2 in the resistance control process, to prevent the heater temperature from overshooting excessively during a transient temperature rise phase prior to the saturation of the heater resistance. If this duration of the transient control mode P1 is substituted by the duration of the steady control mode P2 in the resistance control process as shown in FIG. 9, the heater is energized with excessive power so as to forcefully adjust a low resistance value Ri specific to the transient temperature rise phase to a target resistance value $R_T$ determined with reference to the saturation resistance in the steady control mode. This results in a considerably large overshoot in the heater temperature. In addition, there arises a problem that it takes a long time for the stabilization of the heater resistance Ri and the heater temperature. The energization of the sheath heater 2 is thus controlled in the transient control mode P1 of FIG. 4 in such a manner that the integral consumption of power during the duration of the transient control mode P2 becomes smaller than the integral consumption of power expected by substitution of the duration of the steady control mode P2 (indicated as P1) as shown in FIG. 9.

In the present embodiment, the duty ratio η for PWM control in the transient control mode P1 is uniquely given according to the plug applied voltage Vx (the incoming voltage), with reference to a table (or a function) shown in FIG. 3, regardless of the resistance of the sheath heater 2 (the resistance heater). Further, the duty ratio for PWM control in the transient control mode P1 and the duration of the transient control mode P1 are determined in such a manner as to limit δR=R0−R1 to within a range of ±30% (preferably ±10%) where the target resistance value of the sheath heater 2 under energization control in the steady control mode P2 is taken as R0; and the resistance of the resistance heater at the completion of energization control in the transient control mode P1 is taken as R1.

Before shifting to the transient control mode P1, the resistance heater is energized under the preheating mode P0 in which the average electrical power is set larger than that in the transient control mode P1 in the present embodiment as shown in FIG. 4, in order to increase the quick heating performance of the sheath heater 2. The heater is herein continuously energized in the preheating mode P0 through application of the plug voltage Vx, but may alternatively be energized under PWM control in the preheating mode P0 using a larger duty ratio than that in the transient control mode P1. When the plug applied voltage Vx (the incoming voltage) fluctuates, the duration of energization in the preheating mode P0 (hereinafter referred to as a "preheating time") Tp is increased or decreased as needed so that the integral consumption of power in the preheating mode P0 falls within a predetermined range.

As shown in FIG. 1, the switching signal generating section 111 of the main control unit 110 generates a switching signal for the preheating mode, the transient control mode or the steady control mode upon receipt of a mode selection signal SP, ST or SS as a control command signal from ECU 150. The selection of the control mode is carried out upon switching the output of the mode selection signal SP, ST or SS from ECU 150. (Either one of three mode selection signals SP, ST and SS is selectively output from ECU 150, and two or more selection signals are not output concurrently.) The switching signal may be generated by producing the whole of the main control unit 110 including the switching signal generating section 110 from a microcomputer, preparing therein separate signal generation programs for the respective modes, and then, selectively starting the signal generation program in conformance with the mode selection signal SP, ST or SS. In the present embodiment, however, the switching signal is generated in accordance with the following hardware logic.

In the steady control mode, the plug applied voltage Vx is input to a reference duty ratio calculating section 124. The reference duty ratio calculating section 124 calculates the reference duty ratio η0 by the above equation (3) in accordance with the plug applied voltage Vx. The calculated reference duty ratio η0 is sent to a first PWM signal generating section 126. The heater resistance Ri is also input into the first PWM signal generating section 126. The first PWM signal generating section 126 calculates the difference ΔR between the heater resistance Ri and the target resistance value $R_T$. Then, the first PWM signal generating section 126 determines the correction factor κ corresponding to the difference ΔR with reference to e.g. a table shown in FIG. 12, gives the final duty ratio η by correction of the reference duty ratio η0 based on the above equation (4), and outputs a PWM signal responsive to the duty ratio η0. This PWM signal is input into an AND gate circuit 130. Only when receiving the steady control mode selection signal SS, the AND gate circuit 130 sends the PWM signal to FET 106 via an OR gate circuit 132 and the diagnosis gate circuit 134. In this way, the energization of the sheath heater 2 of the glow plug 1 is PWM-controlled according to the duty ratio η in the steady control mode.

In the case of software control, it is practicable in the transient control mode to determine a duty ratio η' for the transient control mode with reference to a table shown in FIG. 13 in accordance with the plug applied voltage Vx and then generate a PWM signal indicating the duty ratio η'. The following hardware processing is however conducted in the present embodiment. The plug applied voltage Vx is first input to the reference duty ratio calculating section 124. The reference duty ratio calculating section 124 calculates the reference duty ratio η0 by the above equation (3) in accordance with the plug applied voltage Vx and outputs the PWM signal responsive to the reference duty ratio η0. The PWM signal is input to the AND gate circuit 128. Only when receiving the transient control mode selection signal ST, the AND gate circuit 128 sends the PWM signal to FET 106 via the OR gate circuit 132 and the diagnosis gate circuit 134. In this way, the energization of the sheath heater 2 of the glow plug 1 is PWM-controlled according to the duty ratio η' in the transient control mode.

In the preheating mode, the heating mode selection signal SP is distributed to two AND gate circuits 118 and 125. The first AND gate circuit 118 receives a preheating enabling signal PY from a preheating time setting section 116 as well as the mode selection signal SP. The preheating time setting section 116 receives the plug applied voltage Vx, retrieves a preheating time Tp from e.g. a table shown in FIG. 14 in accordance with the plug applied voltage Vx, and outputs the preheating enabling signal PY until the preheating time Tp is up. Then, the energization signal of FET 106 is sent from the first AND gate circuit 118 to FET 106 via the OR gate circuit 132 continuously until the preheating time Tp is up.

The second AND gate circuit 125 receives the preheating mode selection signal SP. Further, the preheating enabling signal PY from the preheating time setting section 116 is input to a NOT gate circuit 127. The NOT gate circuit 127 sends no output signal NP to the second AND gate circuit 125 when receiving the preheating enabling signal PY, and sends an output signal NP to the second AND gate circuit 125 when not receiving the preheating enabling signal PY. Upon receipt of the preheating mode selection signal SP and the output signal NP from the NOT gate circuit 127, the second AND gate circuit 125 produces output to a third AND gate circuit 120. The PWM control signal for the transient control mode is also distributed to the third AND gate circuit 120. The output time of the preheating mode selection signal SP from ECU 150 is herein adjusted to the maximum allowable duration of the preheating enabling signal PY set by the preheating time setting section 116. When there is a remaining output time of the preheating mode selection signal SP at the conclusion of the duration of the preheating enabling signal PY, the third AND gate circuit 120 transmits the PWM control signal for the transient control mode instead in response to the output from the second AND gate 125 up until the AND gate circuit 128 for the transient control mode becomes effected. The OR gate circuit 132 may be omitted if the outputs of four AND gate circuits 118, 120, 128 and 130 are linked by a wired OR connection.

Figure 6:
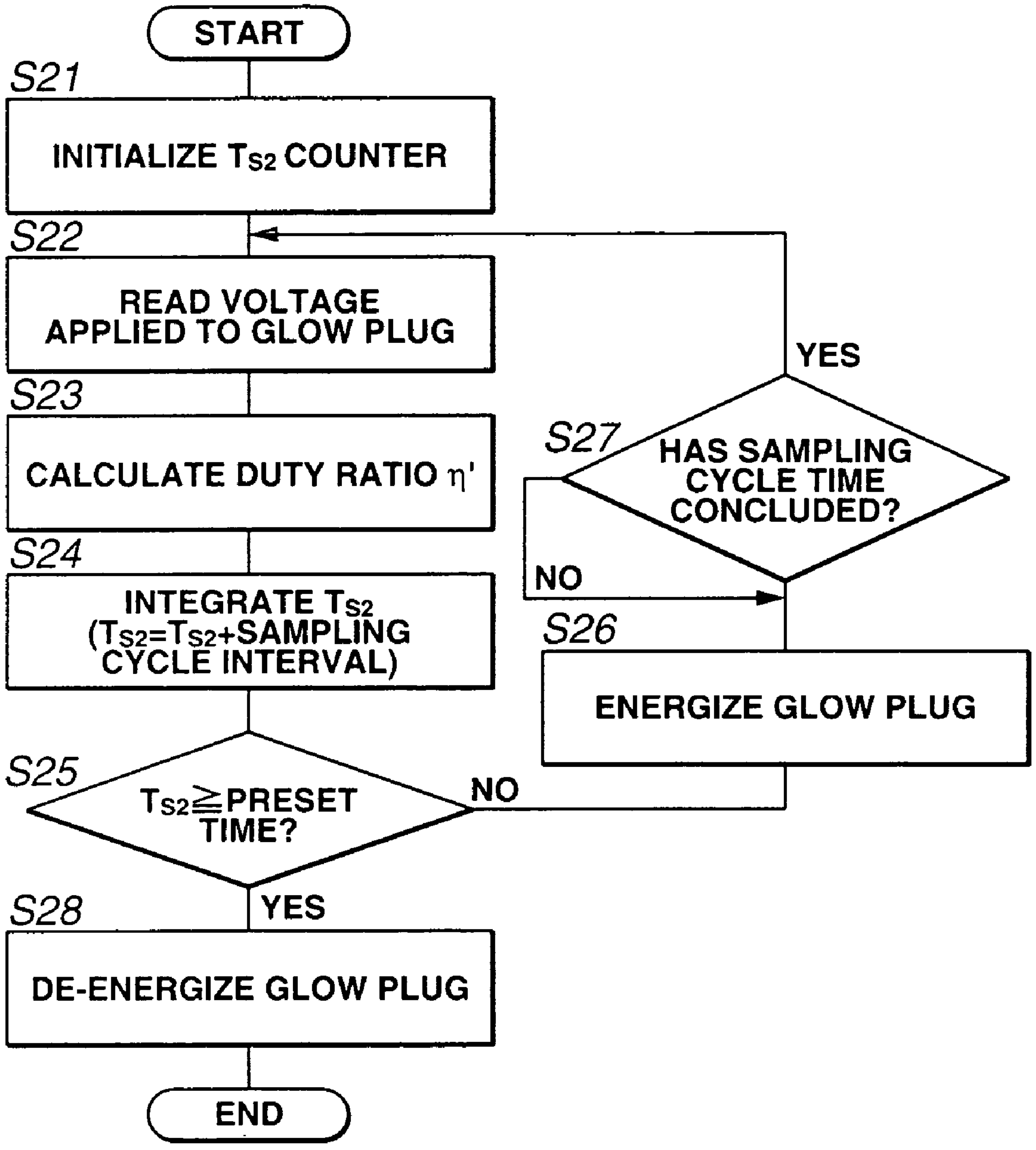
FIG. 6 is a flowchart for the control of the duration of energization in a transient control mode according to the first embodiment of the present invention.

FIG. 6 shows a processing example of the management of the duration of the transient control mode (conducted by ECU 150, but the processing steps of the main control unit 10 are also shown in FIG. 6 for ease of understanding). The management processing is herein aimed to adjust the electrical power in the transient control mode under the control of the reference duty ratio η0 in accordance with the plug applied voltage Vx and to thereby set the control duration fixedly. First, an elapsed-time counter TS2 is initialized to start the output of the transient control mode selection signal ST in step S21. The following processing steps S22 to S23 are performed by the main control unit 10. In step S22, the plug applied voltage Vx is retrieved. In step S23, the reference duty ratio η0 for the transient control mode is determined according to the plug applied voltage Vx. In step S24, the elapsed-time counter TS2 is incremented by a Vx sampling cycle time. In step S25, it is checked whether the elapsed-time counter TS2 has reached a preset time. If the counter TS2 has not reached the present time, the energization is conducted using the reference ratio η0 in step S26. In step S27, the conclusion of the next sampling cycle time is awaited. Then, the control goes back to step S22 to repeat the above processing steps. If the counter TS2 has reached the preset time in step S25, the output of the transient control mode selection signal ST is stopped in step S28 to finish the energization control under the transient control mode. The control then shifts to the control duration management routine for the steady control mode.

Figure 8:
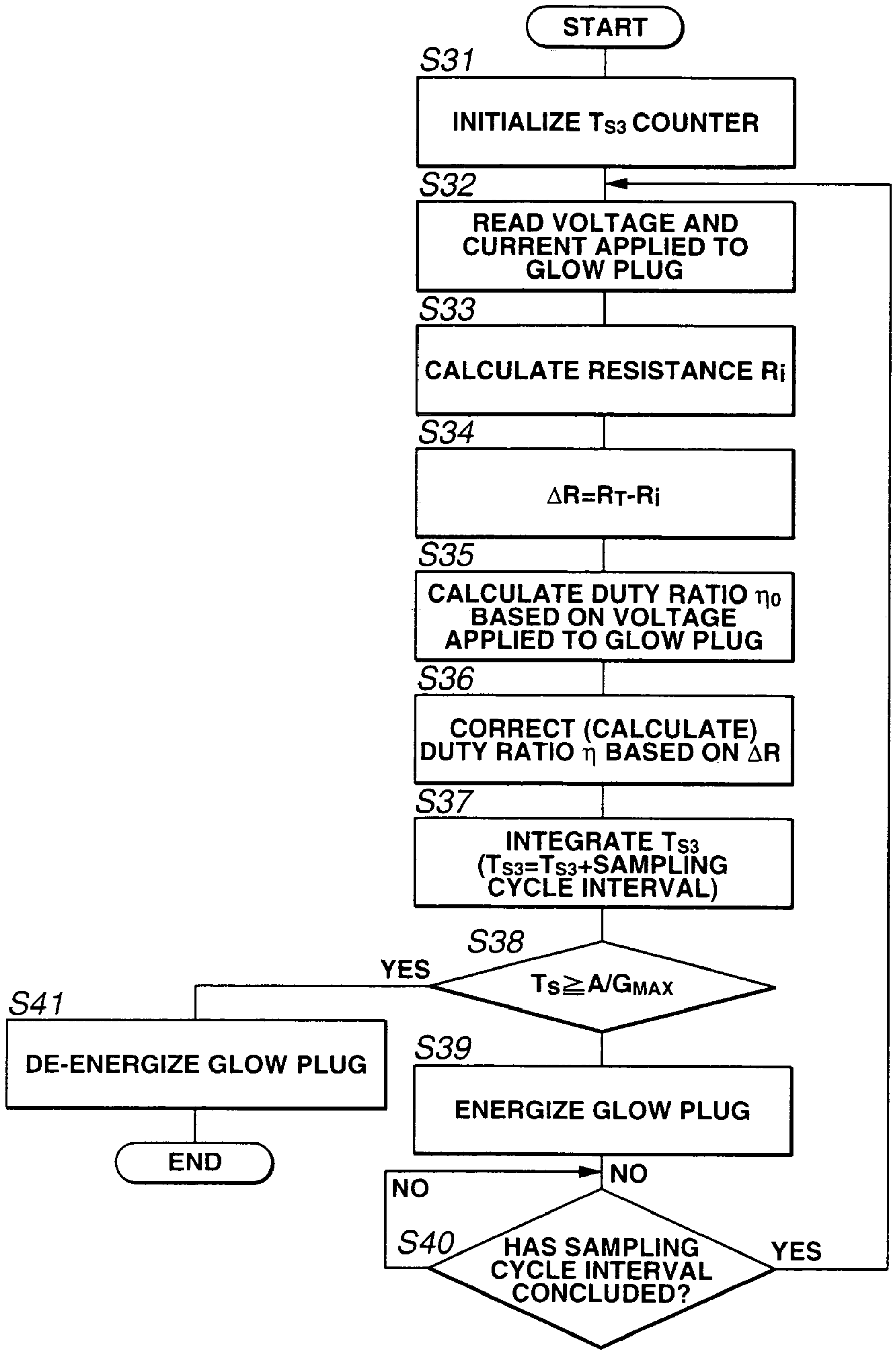
FIG. 8 is a flowchart for the control of the duration of energization in a steady control mode according to the first embodiment of the present invention.

FIG. 8 shows a processing example of the management of the duration of the steady control mode. In step S31, an elapsed-time counter TS3 is initialized to start the output of the steady control mode selection signal SS. The following processing steps S32 to S36 are performed by the main control unit 110. In step S32, the plug applied voltage Vx and current Ix are retrieved. In step S33, the heater resistance Ri is calculated. In step S34, the difference ΔR between the heater resistance Ri and the target resistance value RT. In step S35, the reference duty ratio η0 is determined in the above-explained manner. In step S36, the reference duty ratio η0 is corrected according to the difference ΔR in the above-explained manner, thereby giving the final duty ratio η. In step S37, the elapsed-time counter TS3 is incremented by a Vx sampling interval. In step S38, it is checked the elapsed-time counter TS3 has reached a set time A/Gmax for auxiliary heater preheating after the engine start (so called "after-glow"). If the counter TS3 has not reached the set time A/Gmax, the energization is conducted using the duty ratio η in step S39. In step S40, the conclusion of the next sampling cycle time is awaited. Then, the control goes to step S32 to repeat the above processing steps. If the counter TS3 has reached the preset time A/Gmax in step S38, the output of the steady control mode selection signal ST is stopped in step S41 to finish the energization control under the steady control mode.

Figure 17:
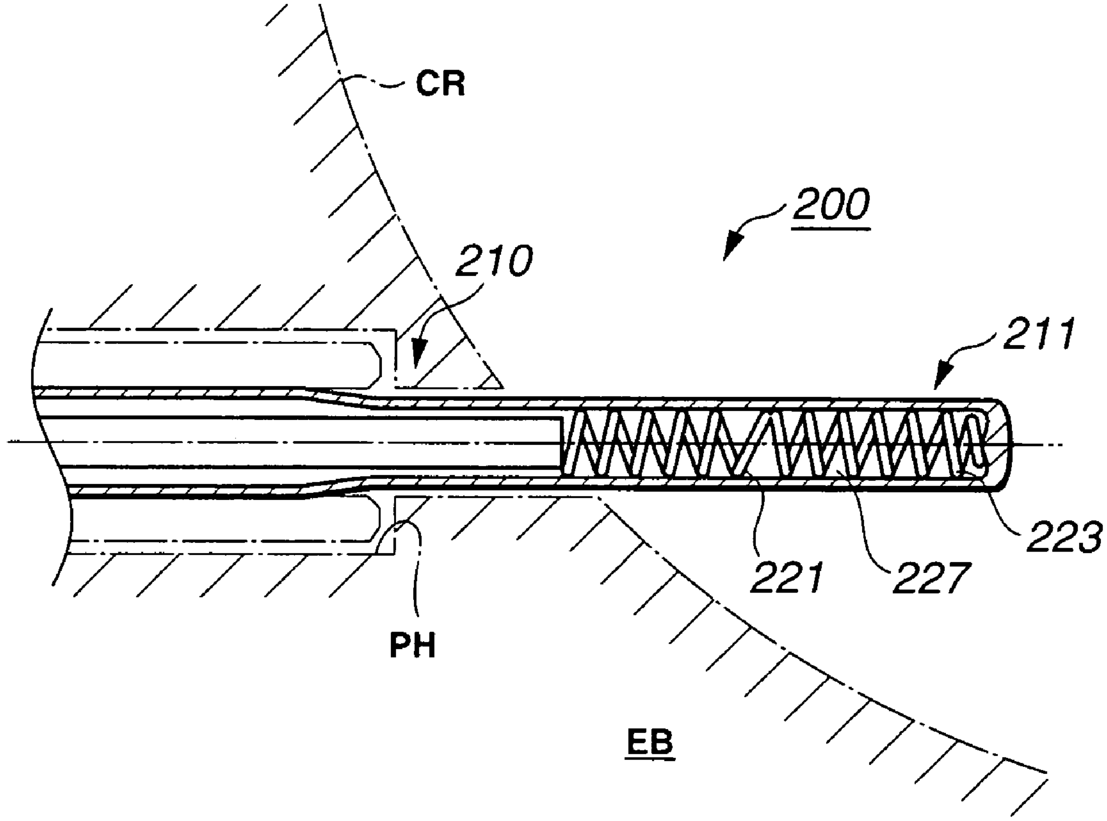
FIG. 17 is a schematic view of a glow plug according to the second embodiment of the present invention.
Figure 19:
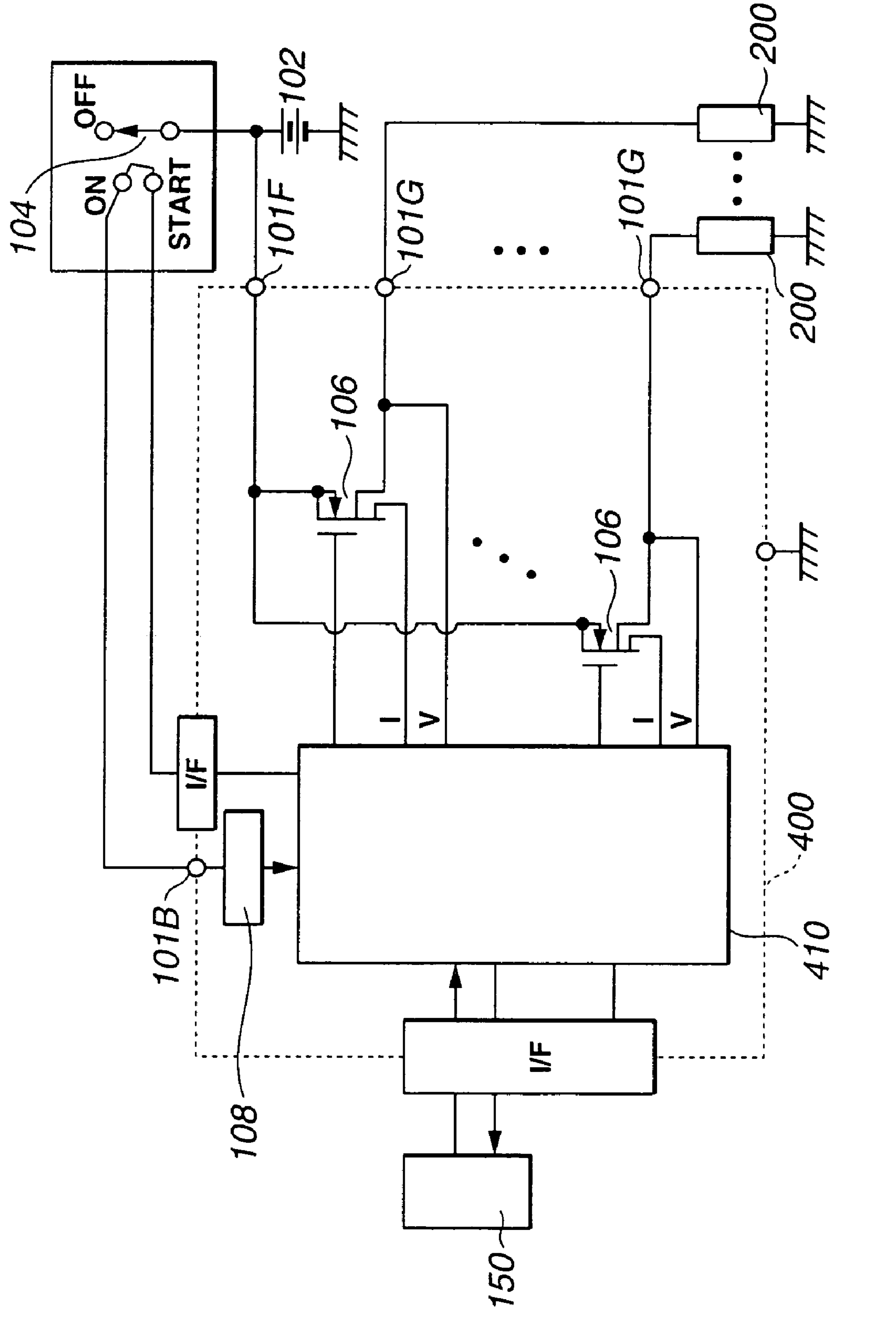
FIG. 19 is a block diagram showing the electric configuration of a glow plug control device according to the second embodiment of the present invention

Next, a second embodiment of the present invention will be explained. FIG. 19 is a block diagram showing the electric configuration of a glow plug control device 400 according to the second embodiment of the present invention. FIG. 17 is schematic view showing a main part of a glow plug 200 for use with the control device 400 in a state where the glow plug 200 is mounted in an engine block.

The glow plug 200 of the second embodiment has different heating and control coils in comparison with the first embodiment. In further comparison with the first embodiment, the control device 400 of the second embodiment is different in that the main control unit 410 is not configured to receive the selection signal SP, ST, SS for each mode (preheating mode, transient control mode, steady control mode) from ECU 150 but is configured to carry out the energization control in these modes successively by its own software processing. Accordingly, an explanation will be given to different parts and portions to thereby omit or simplify an explanation of like parts and portions.

As shown in FIG. 17, a sheath heater 210 as a resistance heater of the glow plug 200 includes a sheath tube 211 with a closed front end, a control coil 223 (as a resistive heating element) arranged in a front end side of the sheath tube 211, an inrush current limiting coil 221 (as an inrush current limiting resistor) arranged in a rear end side of the sheath tube 211 in series connection with the control coil 223 and an insulating material of magnesia powder 227 with which the control coil 223 and the inrush current limiting coil 221 are sealed in the sheath tube 211. The control coil 223 can be made of e.g. a material having a specific electric resistance R20 of 5 to 20 μΩ·cm at 20° C. and a ratio R1000/R20 of specific electric resistance R1000 at 1000° C. to specific electric resistance R20 at 20° C. of 6 or larger, and more specifically, a Ni metal, a Co—Fe alloy or a Co—Fe—Ni alloy. The inrush current limiting coil 221 can be made of e.g. a material having a specific electric resistance R20 of 80 to 200 μΩ·cm at 20° C. and a ratio R1000/R20 of specific electric resistance R1000 at 1000° C. to specific electric resistance R20 at 20° C. of 0.8 to 3, and more specifically, a Fe—Cr alloy or a Ni—Cr alloy.

The glow plug 200 is mounted in a plug hole PH of the engine block EB with a front end portion of the sheath heater 2 protruding in an engine combustion chamber CR by a predetermined length. As shown in FIG. 17, the control coil 223 thus protrudes in the engine combustion chamber CR. As the control coil 223 having a ratio R1000/R20 of 6 or larger, more preferably 7.5 or larger, protrudes at least partly in the engine combustion chamber CR in this way, the control coil 223 becomes directly and promptly influenced by the cooling of the heater due to fuel injection and compact gas. As a result, the resistance of the control coil 223 varies quickly in response to heater cooling. It is therefore possible to maintain the heater resistance stably.

It is further possible to arrange the control coil 223 easily so as to protrude in the engine combustion chamber CR at the occasion of mounting the glow plug 200 on the engine block with the sheath tube 211 projecting in the engine combustion chamber CR, as the control coil 223 lies in the front end side of the sheath tube 211.

When the inrush current limiting coil 221 is connected in series with the rear end of the control coil 223 within the sheath tube 211 as described above, the composite resistance of the control coil 223 and the inrush current limiting coil 221 becomes increased to prevent the passage of a large electric current through the control coil 223. This makes it possible to avoid the breakage of FET 106.

The inrush current limiting coil 221 has a positive temperature coefficient of resistance and a smaller ratio R1000/R20 of electrical resistance R1000 at 1000° C. to electrical resistance R20 at 20° C. than that of the control coil 223. This allows the control coil 223 in the front end side of the sheath tube 221 to generate so large amount of heat as to preheat the inside of the engine combustion chamber effectively.

As shown in FIG. 19, the main control unit 410 of the control device 400 receives a stabilized operating voltage for signal processing through a stabilized power supply 108. The stabilized power supply 108 receives power from a battery 102 via a key switch 104 and a terminal 101B. When the key switch 104 is turned on and placed to a start position, the stabilized power supply 108 is supplied with power, and then, the main control unit 410 becomes operated. When the key switch 104 is turned off, the stabilized power supply 108 becomes cut off to stop the operations of the main control unit 410.

The voltage of the battery 102 is applied to the drain of each FET 106 through a terminal 106F. The sources of FET 106 are connected to the plurality of glow plug 200 via terminals 11G, respectively. The switching signal from the main control unit 410 is input to the gate of FET 106 to turn on and off the energization of each glow plug 200.

The main control unit 410 receives a voltage applied from the battery 102 to each glow plug 200 as well as a current applied to each glow plug 200. The voltage and current applied to the glow plug 200 are input to the main control unit 410, and then, digitized by an A/D converter (not shown).

The main control unit 410 is also in communication with ECU 150 comprising a microcomputer via an interface so as to e.g. send a failure notification signal indicating heater wire breakage etc. in the glow plug 200.

Figure 5:
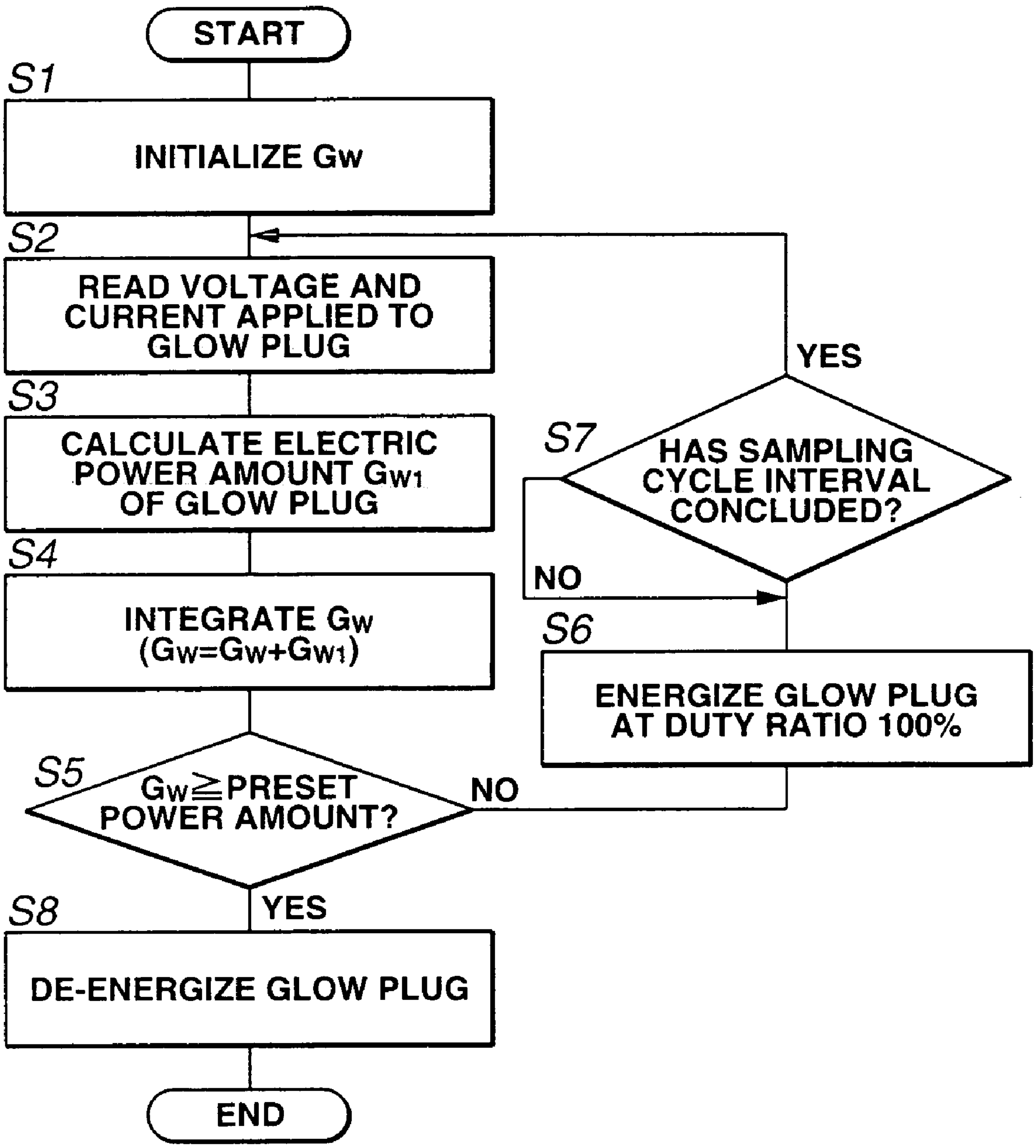
FIG. 5 is a flowchart for the control of the duration of energization in a preheating mode according to a second embodiment of the present invention.

The energization control of the glow plug 200 conducted by the glow plug control unit 400 will be explained below with reference to FIG. 5. First, the integral power consumption Gw is initialized in step S1. In step S2, the plug applied voltage Vx and current Ix are retrieved from the main control unit 410. Taking the sampling cycle time as τ, the increment Gw1 of power during the interval τ is determined by Vx·Ix·τ in step S3. In step S4, the integral power consumption Gw is incremented by the determined power increment Gw1. In step S5, it is determined whether the integral power consumption Gw has reached a set power amount. If the integral power amount has not reached the set power amount, the glow plug 200 is energized in step S6. The duty ratio is herein set to 100%. The control then goes to step S7. In step S7, the conclusion of the next sampling cycle time is awaited. After that, the control goes back to step S2 to repeat the above processing steps. If the integral power consumption Gw has reached the set power amount in step S5, the energization control under the preheating mode is finished in step S8. The control then shifts to the control duration management routine for the transient control mode.

Figure 7:
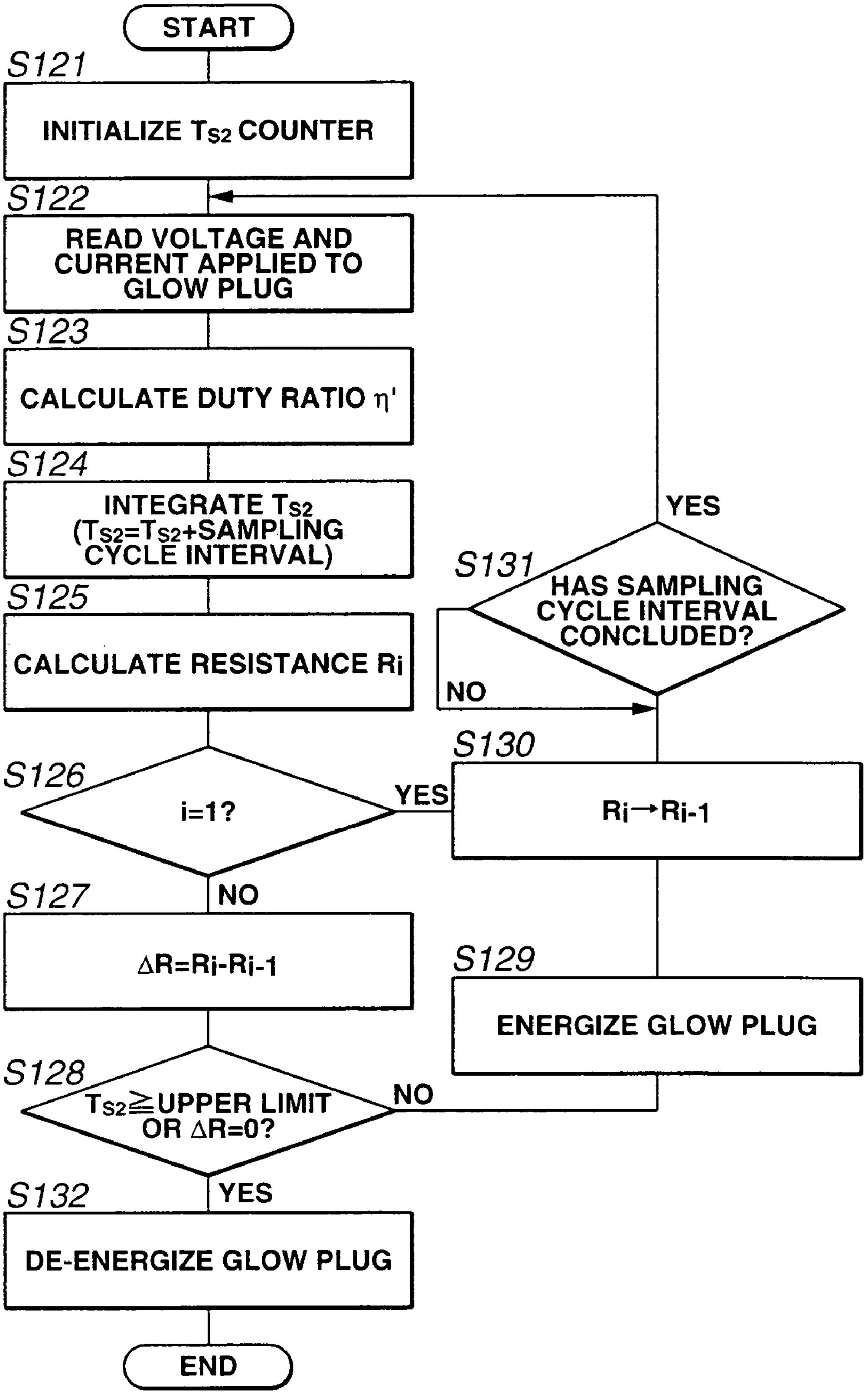
FIG. 7 is a flowchart for the control of the duration of energization in a transient control mode according to the second embodiment of the present invention.

FIG. 7 shows a processing example of the management of the duration of the transient control mode in the second embodiment. This management processing is aimed to determine the timing of finishing the transient control mode depending on whether the heater resistance Ri has reached a saturation value without setting the duration of the transient control mode fixedly. A maximum limit is set on the duration of the transient control mode. In step S121, an elapsed-time counter TS2 first is initialized. In step S122, the plug applied voltage Vx is retrieved. In step S123, the reference duty ratio η0 for the transient control mode is determined according to the plug applied voltage Vx. The plug applied current Ix is also retrieved in step S122. In step S124, the elapsed-time counter TS2 is incremented by a Vx sampling cycle time. In step S125, the heater resistance Ri is calculated from the retrieved voltage Vx and current Ix. In step S126, it is checked whether i=1 or not (i.e. whether the calculated heater resistance Ri is an initial heater resistance value R1 or not). If i=1, the control goes to step S130. If i≠1, the control goes to step S127. In step S127, the difference ΔR between the heater resistance Ri and its previous heater resistance value $Ri_{-1}$ is determined. In step S128, it is checked whether either one of conditions (hereinafter referred to as "termination conditions") in which the elapsed-time counter TS2 has reached the maximum limit and in which ΔR equals to zero (the resistance has been saturated) s satisfied. If any termination condition is not satisfied, the energization is conducted based on the reference duty ratio η0 in step S129. In step 130, the presently obtained heater resistance Ri substitutes for the previous heater resistance $Ri_{-1}$. In step S131, the conclusion of the next sampling cycle time is awaited. Then, the control goes back to step S1122 to repeat the above processing steps. If either one of the termination conditions is satisfied in step S128, the energization under the transient control mode is finished in step S132. The control then shifts to the control duration management routine for the steady control mode.

Figure 20:
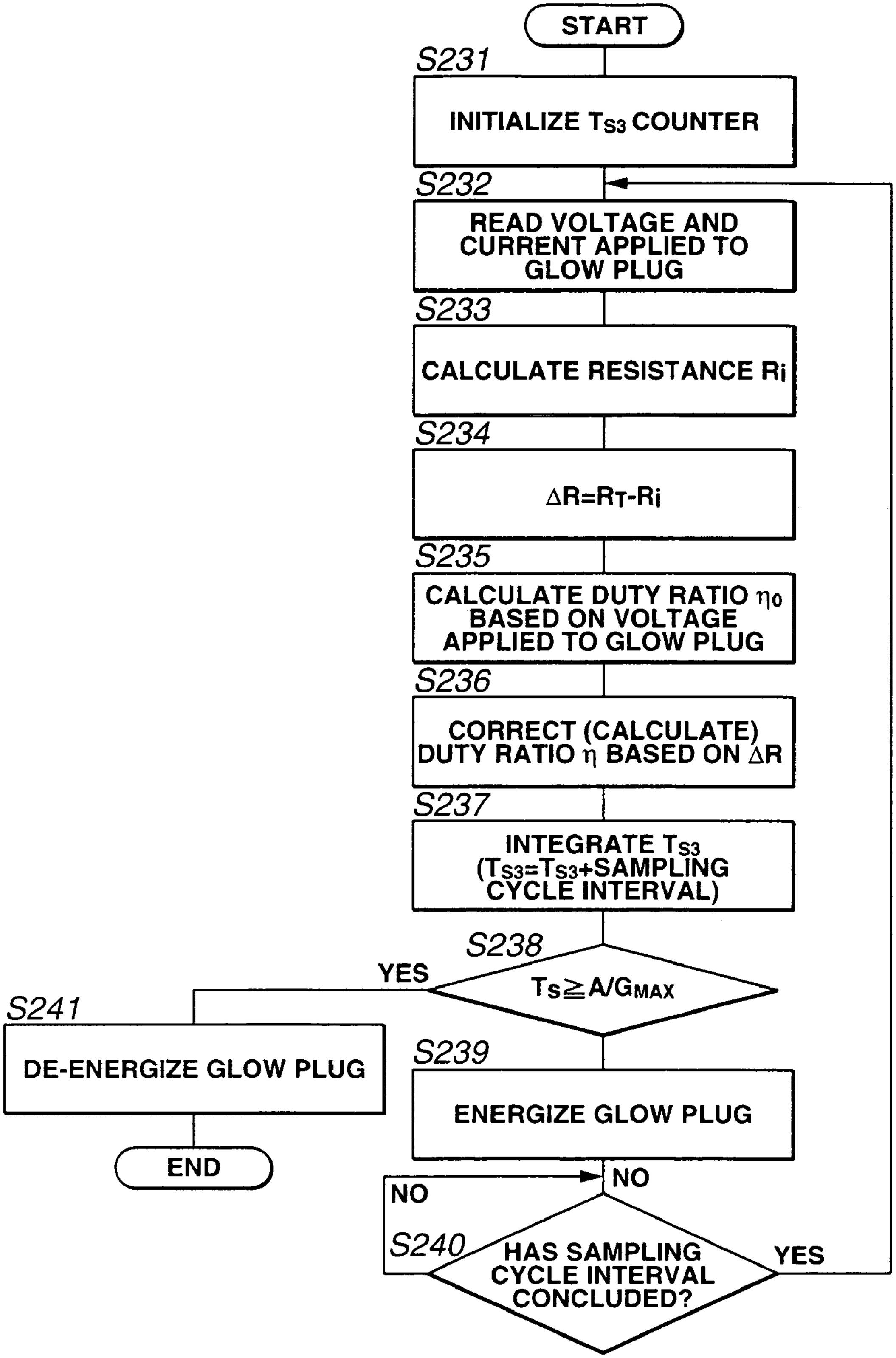
FIG. 20 is a flowchart for the control of the duration of energization in the steady control mode according to the second embodiment of the present invention.

FIG. 20 shows a processing example of the management of the duration of the steady control mode in the second embodiment. In step S231, an elapsed-time counter T3 is initialized. In step S232, the plug applied voltage Vx and current Ix are retrieved. In step S233, the heater resistance Ri is determined. In step S234, the difference ΔR between the heater resistance Ri and its target value RT is calculated. In step S235, the reference duty ratio ratio η0 is determined by the above-explained method. In step S236, the reference duty ratio η0 is corrected in accordance with the value ΔR by the above-explained method, thereby giving the final duty ratio η. In step S237, the elapsed-time counter TS3 is incremented by a Vx sampling cycle time. In step S238, it is checked whether the elapsed-time counter TS3 has reached a set time A/Gmax for auxiliary heater preheating after the engine start (so called "after-glow"). If the counter TS3 has not reached the set time A/Gmax, the energization is conducted using the duty ratio η in step S239. In step S240, the conclusion of the next sampling cycle time is awaited. Then, the control goes to step S232 to repeat the above processing steps. If the counter TS3 has reached the preset time A/Gmax in step S238, the energization under the steady control mode is finished in step S241.

Figure 18:
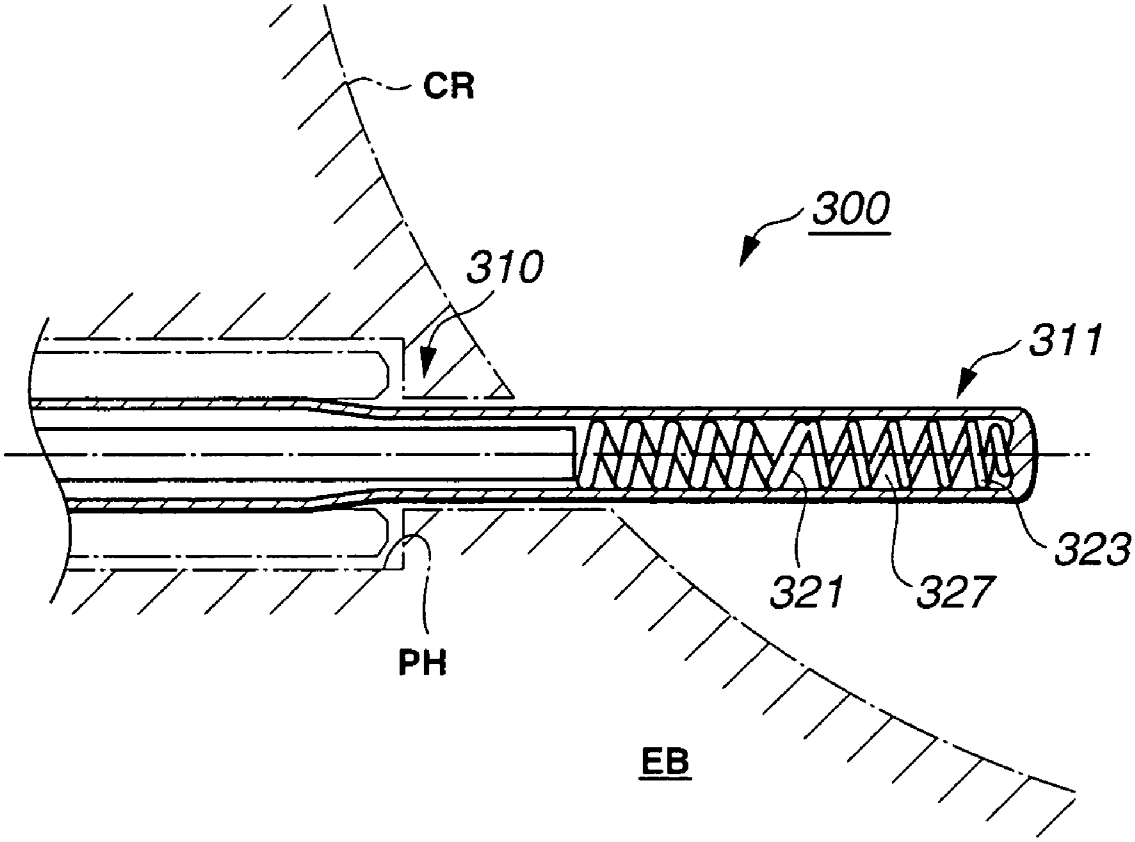
FIG. 18 is a schematic view of a glow plug according to a third embodiment of the present invention.

Finally, a third embodiment of the present invention will be explained. FIG. 18 is a schematic view showing a main part of a glow plug 300 in a state where the glow plug 300 is mounted in an engine block. As compared with the first embodiment, the glow plug 300 of the third embodiment has different coil members such as heating and control coils. The other parts and portions of the third embodiment are structurally similar to those of the second embodiment. Accordingly, an explanation will be given to different parts and portions to omit or simplify an explanation of such like parts and portions.

As shown in FIG. 18, a sheath heater 310 as a resistance heater of the glow plug 300 includes a cylindrical sheath tube 311 with a closed front end, a first control coil (resistive heating element) 323 arranged in a front end side of the sheath tube 311, a second control coil (inrush current limiting resistor) 321 arranged in a rear end side of the sheath tube 311 in series connection with the first control coil 323, and an insulating material of magnesia powder 327 with which are sealed in the sheath tube 311 as in the first embodiment. The first control coil 323 and the second control coil 321 are made of the same material, for example, having a specific electrical resistance R20 of 5 to 20 μΩ·cm at 20° C. and a ratio R1000/R20 of 6 or larger where R1000 is a specific electrical resistance at 1000° C., and more specifically, a Ni metal, a Co—Fe alloy or a Co—Fe—Ni alloy. Further, the first control coil 323 protrudes in an engine combustion chamber CR. As the first control coil 323 having a ratio R1000/R20 of 6 or larger protrudes at least partly in the engine combustion chamber CR, the first control coil 323 becomes directly and promptly influenced by the cooling of the heater due to fuel injection and combustion chamber. As a result, the resistance of this coil member becomes varied rapidly in response to heater cooling. It is therefore possible to maintain the heater resistance stably.

It is further possible to arrange the first control coil 323 easily so as to protrude in the engine combustion chamber CR at the occasion of mounting the glow plug 200 on the engine block with the sheath tube 311 projecting in the engine combustion chamber CR, as the control coil 323 lies in the front end side of the sheath tube 311.

When the second control coil 321 is connected in series with the rear end of the first control coil 323 as described above, the composite resistance of the first control coil 323 and the second control coil 321 becomes increased to prevent the passage of a large electric current through the first control coil 323. This makes it possible to avoid the breakage of FET 106.

The first control coil 323 has a wire diameter of 0.2 mm, and the second control coil has a wire diameter of 0.275 mm. Namely, the wire diameter of the second control coil 321 is larger than that of the first control coil 323. With the wire diameter of the second control coil 321 being set larger than that of the first control coil 323 in this way, the first control coil 323 becomes able to produce a larger amount of heat than the second control coil 321. This allows effective preheating of the inside of the engine combustion chamber CR.

Although the PWM control method is used for the energization control under the transient control mode in the above-described embodiments, a PAM (Pulse Amplitude Modulation) control method or a ON-OFF switching control method in which the switching cycle is not fixed may alternatively be used. Further, the whole of the duration of the transient control mode may be defined as a fixed non-energization period. The management processing of FIGS. 6 and 8 are shared between the main control unit 10 and ECU 150 in the above embodiment, but the present invention is not limited to this configuration. For example, the main control unit 10 may be configured to conduct the management processing of FIGS. 5 to 8 by itself upon receipt of an actuation signal (such as a key-on signal) from ECU 150. Although the glow plugs 1 and 200 are connected to the control devices 100 and 400, respectively, so that the energization of the glow plugs 1 and 200 are controlled by the control devices 100 and 400 in the above embodiments, the present invention is not limited to these configurations. The glow plugs 200 and 300 may be connected to the control device 100. The glow plugs 1 and 300 may be connected to the control device 400.

Although the present invention has been described with reference to specific embodiments of the invention, the invention is not limited to the above-described embodiments. Various modification and variation of the embodiments described above will occur to those skilled in the art in light of the above teaching.

The invention claimed is:

1. A control device for a glow plug, the glow plug comprising a resistance heater extending axially of the glow plug, including a resistive heating element that has a ratio R1000/R20 of electrical resistance R1000 at 1000° C. to electrical resistance R20 at 20° C. of 6 or larger and being mounted in an engine block with a front end portion of the resistance heater and at least part of the resistive heating element protrudingly located in an engine combustion chamber, the control device being configured to control energization of the resistance heater in a steady control mode to adjust electrical power supplied to the resistance heater in such a manner as to keep a resistance of the resistance heater within a predetermined range, the resistance heater including a cylindrical sheath tube having a closed front end to which the resistive heating element is connected and an inrush current limiting resistor connected in series with the resistive heating element so as to reduce an inrush current through the resistive heating element, and the inrush current limiting resistor having a smaller ratio R1000/R20 of electrical resistance R1000 at 1000° C. to electrical resistance R20 at 20° C. than that of the resistive heating element.

2. The control device of the glow plug according to claim 1, comprising a semiconductor switch connected in series with the resistive heating element so as to control the energization of the resistance heater by means of the semiconductor switch in the steady control mode.

3. The control unit of the glow plug according to claim 1, each of the resistive heating element and the inrush current limiting resistor being a coil member, and the inrush current limiting resistor having a larger wire diameter than that of the resistive heating element.

4. The control device of the glow plug according to claim 1, the resistance heater including a cylindrical sheath tube closed at a front end thereof, the resistive heating element, and a heating element connected at front and rear ends thereof with the front end of the sheath tube and the resistive heating element, respectively, and having a smaller ratio R1000/R20 of electrical resistance R1000 at 1000° C. to electrical resistance R20 at 20° C. than that of the resistive heating element.

5. The control device of the glow plug according to claim 1, the glow plug being mounted with the whole of the resistive heating element protrudingly located in the engine combustion chamber.

6. The control device of the glow plug according to claim 1, the control device being configured to set a duration of energization control in a transient control mode, prior to starting the energization control in the steady control mode, in such a manner that the integral of power supplied to the resistance heater during the duration of energization control in the transient control mode is smaller than the integral of power to be supplied when said duration of energization control in the transient control mode is substituted with a duration of energization in the steady control mode.

7. The control device of the glow plug according to claim 1, the control device being configured to set a duration of energization control in a transient control mode, prior to starting the energization control in the steady control mode, by combination of an energization enabling period in which the energization of the resistance heater is enabled and an energization restricting period in which the energization of the resistance heater is more restricted than in the energization enabling period in such a manner that a ratio of the energization enabling period to the duration of energization control in the transient control mode is uniquely determined based on an incoming voltage to the resistance heater irrespective of the resistance of the heater.

8. The control device of the glow plug according to claim 1, the control device being configured to set a duration of energization control in a transient control mode, prior to starting the energization control in the steady control mode, to prevent an excessive temperature rise in the resistance heater in such a manner as to limit $\delta R/R0$ to within a range of ±30% where $\delta R = R0 - R1$; R0 is a target resistance value of the heater under energization control in the steady control mode; and R1 is a resistance value of the heater at the conclusion of energization control in the transient control mode.

9. The control device of the glow plug according to claim 1, the energization of the resistance heater being controlled by a PWM control method in which a duty ratio is determined based on a difference between a measured value and a target value of the resistance of the resistance heater.

10. A glow plug, comprising:

a cylindrical sheath tube with a closed front end;

a resistive heating element connected to the front end of the sheath tube and having a ratio R1000/R20 of electrical resistance R1000 at 1000° C. to electrical resistance R20 at 20° C. of 6 or larger; and an inrush current limiting resistor connected in series with a rear end of the resistive heating element and having a smaller ratio R1000/R20 of electrical resistance R1000 at 1000° C. to electrical resistance R20 at 20° C. than that of the resistive heating element.

11. The glow plug according to claim 10, the resistive heating element having a specific electrical resistance R20 of 5 to 20 μΩ·cm at 20° C.

12. The glow plug according to claim 10, the resistive heating element being made of a Co—Fe—Ni alloy.

13. The glow plug according to claim 10, the resistive heating element having a ratio R1000/R20 of 7.5 or larger.

14. The glow plug according to claim 10, each of the resistive heating element and the inrush current limiting resistor being a coil member, and the inrush current limiting resistor having a larger wire diameter than that of the resistive heating element.

15. A control device for a glow plug, the glow plug comprising a resistance heater that extends axially of the glow plug and includes a resistive heating element having a ratio R1000/R20 of electrical resistance R1000 at 1000° C. to electrical resistance R20 at 20° C. of 6 or larger and an inrush current limiting resistor having a smaller ratio R100/20R of electrical resistance R1000 at 1000° C. to electrical resistance R20 at 20° C. than that of the resistive heating element and being connected in series with the resistive heating element so as to reduce an inrush current through the resistive heating element, the glow plug being mounted in an engine block with a front end portion of the resistance heater and at least part of the resistive heating element protrudingly located in an engine combustion chamber, the control device being configured to control energization of the resistance heater in a steady control mode to adjust electrical power supplied to the resistance heater in such a manner as to keep a resistance of the resistance heater within a specified range.

16. A control device for a glow plug, the glow plug comprising a resistance heater that extends axially of the glow plug and includes a cylindrical sheath tube closed at a front end thereof, a resistive heating element having a ratio R1000/R20 of electrical resistance R1000 at 1000° C. to electrical resistance R20 at 20° C. of 6 or larger and the resistive heating element connected at a front end thereof with the front end of the sheath tube and at a rear end thereof with an inrush current limiting resistor having a smaller ratio R1000/R20 of electrical resistance R1000 at 1000° C. to electrical resistance R20 at 20° C. than that of the resistive heating element, the glow plug being mounted in an engine block with a front end portion of the resistance heater and at least part of the resistive heating element protrudingly located in an engine combustion chamber, the control device being configured to control energization of the resistance heater in a steady control mode to adjust electrical power supplied to the resistance heater in such a manner as to keep a resistance of the resistance heater within a specified range.

17. The control device of the glow plug according to claim 16, comprising a semiconductor switch connected in series with the resistive heating element so as to control the energization of the resistance heater by means of the semiconductor switch in the steady control mode.

18. The control device of the glow plug according to claim 16, the energization of the resistance heater being controlled by a PWM control method in which a duty ratio is determined based on a difference between a measured value and a target value of the resistance of the resistance heater.

19. The control device of the glow plug according to claim 16, the resistance heater including an inrush current limiting resistor connected in series with the resistive heating element so as to reduce an inrush current through the resistive heating element, each of the resistive heating element and the inrush current limiting resistor being a coil member, and the inrush current limiting resistor having a larger wire diameter than that of the resistive heating element.

20. The control device of the glow plug according to claim 16, the glow plug being mounted with the whole of the resistive heating element protrudingly located in the engine combustion chamber.

21. The control device of the glow plug according to claim 16, the control device being configured to set a duration of energization control in a transient control mode, prior to starting the energization control in the steady control mode, in such a manner that the integral of power supplied to the resistance heater during the duration of energization control in the transient control mode is smaller than the integral of power to be supplied when said duration of energization control in the transient control mode is substituted with a duration of energization in the steady control mode.

22. The control device of the glow plug according to claim 16, the control device being configured to set a duration of energization control in a transient control mode, prior to starting the energization control in the steady control mode, by combination of an energization enabling period in which the energization of the resistance heater is enabled and an energization restricting period in which the energization of the resistance heater is more restricted than in the energization enabling period in such a manner that a ratio of the energization enabling period to the duration of energization control in the transient control mode is uniquely determined based on an incoming voltage to the resistance heater irrespective of the resistance of the heater.

23. The control device of the glow plug according to claim 16, the control device being configure to set a duration of energization control in a transient control mode, prior to starting the energization control in the steady control mode, to prevent an excessive temperature rise in the resistance heater in such a manner as to limit $\delta R/R0$ to within a range of ±30% where $\delta R=R0-R1$; R0 is a target resistance value of the heater under energization control in the steady control mode; and R1 is a resistance value of the heater at the conclusion of energization control in the transient control mode.

* * * * *